United States Patent
Li et al.

(10) Patent No.: US 11,172,207 B2
(45) Date of Patent: *Nov. 9, 2021

(54) UNIFIED INTRA BLOCK COPY AND INTER PREDICTION MODES

(71) Applicant: Microsoft Technology Licensing, LLC, Redmond, WA (US)

(72) Inventors: Bin Li, Beijing (CN); Ji-Zheng Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,358

(22) Filed: Sep. 1, 2020

(65) Prior Publication Data

US 2020/0404289 A1    Dec. 24, 2020

Related U.S. Application Data

(63) Continuation of application No. 15/319,797, filed as application No. PCT/CN2014/080302 on Jun. 19, 2014, now Pat. No. 10,785,486.

(51) Int. Cl.
*H04N 19/00* (2014.01)
*H04N 19/159* (2014.01)
(Continued)

(52) U.S. Cl.
CPC ......... *H04N 19/159* (2014.11); *H04N 19/174* (2014.11); *H04N 19/176* (2014.11);
(Continued)

(58) Field of Classification Search
CPC .... H04N 19/174; H04N 19/593; H04N 19/70; H04N 19/513; H04N 19/159; H04N 19/184; H04N 19/176
See application file for complete search history.

(56) References Cited

U.S. PATENT DOCUMENTS

| 10,142,654 B2 | 11/2018 | Peng et al. |
| 2009/0010337 A1 | 1/2009 | Wang |

(Continued)

FOREIGN PATENT DOCUMENTS

| JP | 2011-188007 | 9/2011 |
| KR | 2010-0132973 | 12/2010 |

(Continued)

OTHER PUBLICATIONS

Chang et al., "Non-RCE3: Vertical padding scheme for intra block copy," JCTVC-P0256, 5 pp. (Jan. 2014).

(Continued)

*Primary Examiner* — Zhihan Zhou
(74) *Attorney, Agent, or Firm* — Klarquist Sparkman, LLP

(57) ABSTRACT

Innovations in unified intra block copy ("BC") and inter prediction modes are presented. In some example implementations, bitstream syntax, semantics of syntax elements and many coding/decoding processes for inter prediction mode are reused or slightly modified to enable intra BC prediction for blocks of a frame. For example, to provide intra BC prediction for a current block of a current picture, a motion compensation process applies a motion vector that indicates a displacement within the current picture, with the current picture being used as a reference picture for the motion compensation process. With this unification of syntax, semantics and coding/decoding processes, various coding/decoding tools designed for inter prediction mode, such as advanced motion vector prediction, merge mode and skip mode, can also be applied when intra BC prediction is used, which simplifies implementation of intra BC prediction.

20 Claims, 15 Drawing Sheets software 180 implementing one or more innovations for unified intra BC and inter prediction modes

(51) Int. Cl.
| | |
|---|---|
| *H04N 19/70* | (2014.01) |
| *H04N 19/174* | (2014.01) |
| *H04N 19/176* | (2014.01) |
| *H04N 19/184* | (2014.01) |
| *H04N 19/513* | (2014.01) |
| *H04N 19/593* | (2014.01) |

(52) U.S. Cl.
CPC ......... *H04N 19/184* (2014.11); *H04N 19/513* (2014.11); *H04N 19/70* (2014.11); *H04N 19/593* (2014.11)

(56) References Cited

U.S. PATENT DOCUMENTS

| | | | |
|---|---|---|---|
| 2011/0176614 | A1 | 7/2011 | Sato et al. |
| 2011/0255608 | A1 | 10/2011 | Kim et al. |
| 2011/0261880 | A1 | 10/2011 | Auyeung |
| 2012/0114039 | A1 | 5/2012 | Wang |
| 2012/0269274 | A1 | 10/2012 | Kim et al. |
| 2013/0016785 | A1 | 1/2013 | Wang et al. |
| 2013/0182774 | A1 | 7/2013 | Wang et al. |
| 2013/0322531 | A1* | 12/2013 | Chen ............... H04N 19/70 375/240.12 |
| 2014/0085418 | A1* | 3/2014 | Takahashi ........ H04N 19/597 348/43 |
| 2014/0161186 | A1 | 6/2014 | Zhang et al. |
| 2014/0301465 | A1* | 10/2014 | Kwon ............... H04N 19/109 375/240.16 |
| 2015/0049813 | A1 | 2/2015 | Tabatabai et al. |
| 2015/0256844 | A1 | 9/2015 | Ikai et al. |
| 2015/0271487 | A1* | 9/2015 | Li ..................... H04N 19/52 375/240.02 |
| 2015/0271515 | A1* | 9/2015 | Pang ................. H04N 19/70 375/240.16 |
| 2015/0334405 | A1 | 11/2015 | Rosewarne et al. |
| 2015/0373370 | A1 | 12/2015 | Rapaka et al. |
| 2016/0330474 | A1 | 11/2016 | Liu et al. |
| 2016/0353117 | A1 | 12/2016 | Seregin et al. |
| 2017/0155914 | A1 | 6/2017 | Jeon et al. |
| 2020/0092579 | A1 | 3/2020 | Zhu et al. |
| 2020/0404301 | A1 | 12/2020 | Li et al. |

FOREIGN PATENT DOCUMENTS

| | | |
|---|---|---|
| KR | 2012-0080122 | 7/2012 |
| KR | 2013-108420 | 10/2013 |
| KR | 10-1359490 | 2/2014 |
| WO | WO 2012/144878 | 10/2012 |
| WO | WO 2014/050030 | 4/2014 |

OTHER PUBLICATIONS

Communication pursuant to Article 94(3) EPC dated Aug. 5, 2020, for European Patent Application No. 14828410.2, 7 pp.
Communication pursuant to Article 94(3) EPC dated Dec. 12, 2019, from European Patent Application No. 14895133.8, 4 pp.
Communication pursuant to Article 94(3) EPC dated Dec. 13, 2019, from European Patent Application No. 15704401.7, 7 pp.
Communication pursuant to Article 94(3) EPC dated Jan. 7, 2020, from European Patent Application No. 14903497.7, 4 pp.
Communication pursuant to Article 94(3) EPC dated Feb. 26, 2020, from European Patent Application No. 14895133.8, 4 pp.
Communication pursuant to Article 94(3) EPC dated Apr. 24, 2020, from European Patent Application No. 14876901.1, 6 pp.
Communication pursuant to Article 94(3) EPC dated Oct. 8, 2020, from European Patent Application No. 14876901.1, 5 pp.
Communication pursuant to Article 94(3) EPC dated Oct. 27, 2020, from European Patent Application No. 17175228.0, 7 pp.
Davies, "BBC's Response to the Call for Proposals on Video Compression Technology," JCTVC-A125_r1, 31 pp. (Apr. 2010).
Decision to Grant a Patent dated Oct. 13, 2020, from Japanese Patent Application No. 2019-094546, 5 pp.
Examiner's Report dated Sep. 18, 2019, from Canadian Patent Application No. 2,939,431, 5 pp.
Final Notification of Reasons for Refusal dated Oct. 29, 2019, from Japanese Patent Application No. 2016-544439, 8 pp.
Final Office Action dated Nov. 18, 2019, from U.S. Appl. No. 15/515,559, 14 pp.
Final Office Action dated Mar. 9, 2020, from U.S. Appl. No. 15/515,559, 16 pp.
First Examination Report dated Feb. 28, 2020, from Indian Patent Application No. 201647022794, 5 pp.
First Examination Report dated Mar. 3, 2020, from Indian Patent Application No. 201647024024, 6 pp.
First Examination Report dated Apr. 28, 2020, from Indian Patent Application No. 201647028726, 6 pp.
Kim et al., "High Efficiency Video Coding (HEVC) Test Model 11 (HM11) Encoder Description," JCTVC-M1002, 36 pp. (Apr. 2013).
Kim et al., "High Efficiency Video Coding (HEVC) Test Model 12 (HM12) Encoder Description," JCTVC-N1002, 36 pp. (Jul. 2013).
Lai et al., "Non-RCE4: Major Color Table (Palette) Sharing," JCTVC-P0153_r2, 6 pp. (Jan. 2014).
Notice of Acceptance dated Sep. 9, 2019, from Australian Patent Application No. 2014408228, 3 pp.
Notice of Allowance dated Sep. 29, 2019, from Chinese Patent Application No. 201680007615.4, 4 pp.
Notice of Allowance dated Oct. 17, 2019, from U.S. Appl. No. 15/025,128, 9 pp.
Notice of Allowance dated Mar. 12, 2020, from Canadian Patent Application No. 2,928,495, 1 p.
Notice of Allowance dated Aug. 7, 2020, from U.S. Appl. No. 15/025,032, 14 pp.
Notice of Reasons for Refusal dated Nov. 4, 2020, from Japanese Patent Application No. 2019-208035, 10 pp.
Notice on Grant of Patent dated Oct. 16, 2019, from Chinese Patent Application No. 201480072214.8, 4 pp.
Notice on Reexamination dated Dec. 17, 2019, from Chinese Patent Application No. 201480029735.5, 10 pp.
Notification of Reasons for Refusal dated Mar. 6, 2020, from Korean Patent Application No. 10-2016-7021088, 22 pp.
Notification of Reason for Refusal dated Mar. 18, 2020, from Korean Patent Application No. 10-2016-7012733, 17 pp.
Notification of Reason for Refusal dated Oct. 19, 2020, from Korean Patent Application No. 10-2016-7027339, 12 pp.
Notification of Reason for Refusal dated Oct. 22, 2020, from Korean Patent Application No. 10-2016-7021098, 12 pp.
Office Action dated Jan. 10, 2020, from U.S. Appl. No. 15/025,032, 17 pp.
Office Action dated Sep. 17, 2019, from Mexican Patent Application No. MX/a/2017/004211, 4 pp.
Office Action dated Sep. 3, 2019, from Mexican Patent Application No. MX/a/2016/004705, 4 pp.
Office Action dated Mar. 3, 2020, from Mexican Patent Application No. Mx/a/2017/004211, 7 pp.
Office Action dated Oct. 5, 2020, from U.S. Appl. No. 16/577,883, 22 pp.
Office Action dated Oct. 12, 2020, from Korean Patent Application No. 10-2017-7011675, 12 pp. [No English translation].
Pang et al., "Intra block copy with larger search region," JCTVC-Q0139, 8 pp. (Mar. 2014).
Rosewarne et al., "HEVC Range extensions test model 6 encoder description," JCTVC-P1013, 20 pp. (Jan. 2014).
Communication under Rule 71(3) EPC dated Mar. 12, 2021, from European Patent Application No. 14903497.7, 7 pp.
Notice of Allowance dated Feb. 24, 2021, from Korean Patent Application No. 10-2020-7030004, 7 pp.
Notice of Allowance dated Feb. 24, 2021, from Korean Patent Application No. 10-2016-7021088, 7 pp.
Notice of Allowance dated Apr. 7, 2021, from U.S. Appl. No. 15/025,032, 10 pp.
Notice of Allowance dated Apr. 23, 2021, from Korean Patent Application No. 10-2016-7021098, 6 pp.

(56) References Cited

OTHER PUBLICATIONS

Office Action dated Apr. 28, 2021, from Korean Patent Application No. 10-2016-7027339, 6 pp.
Office Action dated May 4, 2021, from Korean Patent Application No. 10-2021-7010079, 14 pp.
Office Action dated Mar. 4, 2021, from U.S. Appl. No. 17/009,358, 8 pp.
Office Action dated Apr. 13, 2021, from U.S. Appl. No. 16/577,883, 23 pp.
Summons to attend oral proceedings pursuant to Rule 115(1) EPC dated Mar. 19, 2021, from European Patent Application No. 14876901. 1, 9 pp.
Communication under Rule 71(3) EPC dated Dec. 1, 2020, from European Patent Application No. 14828410.2, 7 pp.
Communication pursuant to Article 94(3) EPC dated Feb. 1, 2021, from European Patent Application No. 15704401.7, 6 pp.
Decision to Grant dated Feb. 4, 2021, from European Patent Application No. 14828410.2, 2 pp.
Examiner's Report dated Nov. 6, 2020, from Canadian Patent Application No. 2,959,682, 3 pp.
Notice of Allowance dated Jan. 25, 2021, from Korean Patent Application No. 10-2017-7011675, 7 pp.
Notification of Reason for Refusal dated Dec. 23, 2020, from Korean Patent Application No. 10-2016-7021252, 12 pp.
Notification of Reason for Refusal dated Jan. 28, 2021, from Korean Patent Application No. 10-2017-7001605, 14 pp.
Office Action dated Nov. 10, 2020, from Korean Patent Application No. 10-2020-7030004, 8 pp.
Xu et al., "SCCE1 Test 2.1: IntraBC as Inter PU," JCTVC-R0190, 6 pp. (Jun. 2014).
Chang et al., "RCE3: Results of Subtest B.1 on Nx2N/2NxN Intra Block Copy," JCTVC-P0176, 6 pp. (Jan. 2014).
Examiner's Report dated May 28, 2021, from Canadian Patent Application No. 2,959,682, 3 pp.
Notification of Reasons for Refusal dated Mar. 23, 2021, from Japanese Patent Application No. 2019-208035, 10 pp.
Notification of Reason for Refusal dated Jun. 1, 2021, from Korean Patent Application No. 10-2021-7014829, 8 pp.

\* cited by examiner software 180 implementing one or more innovations for unified intra BC and inter prediction modes

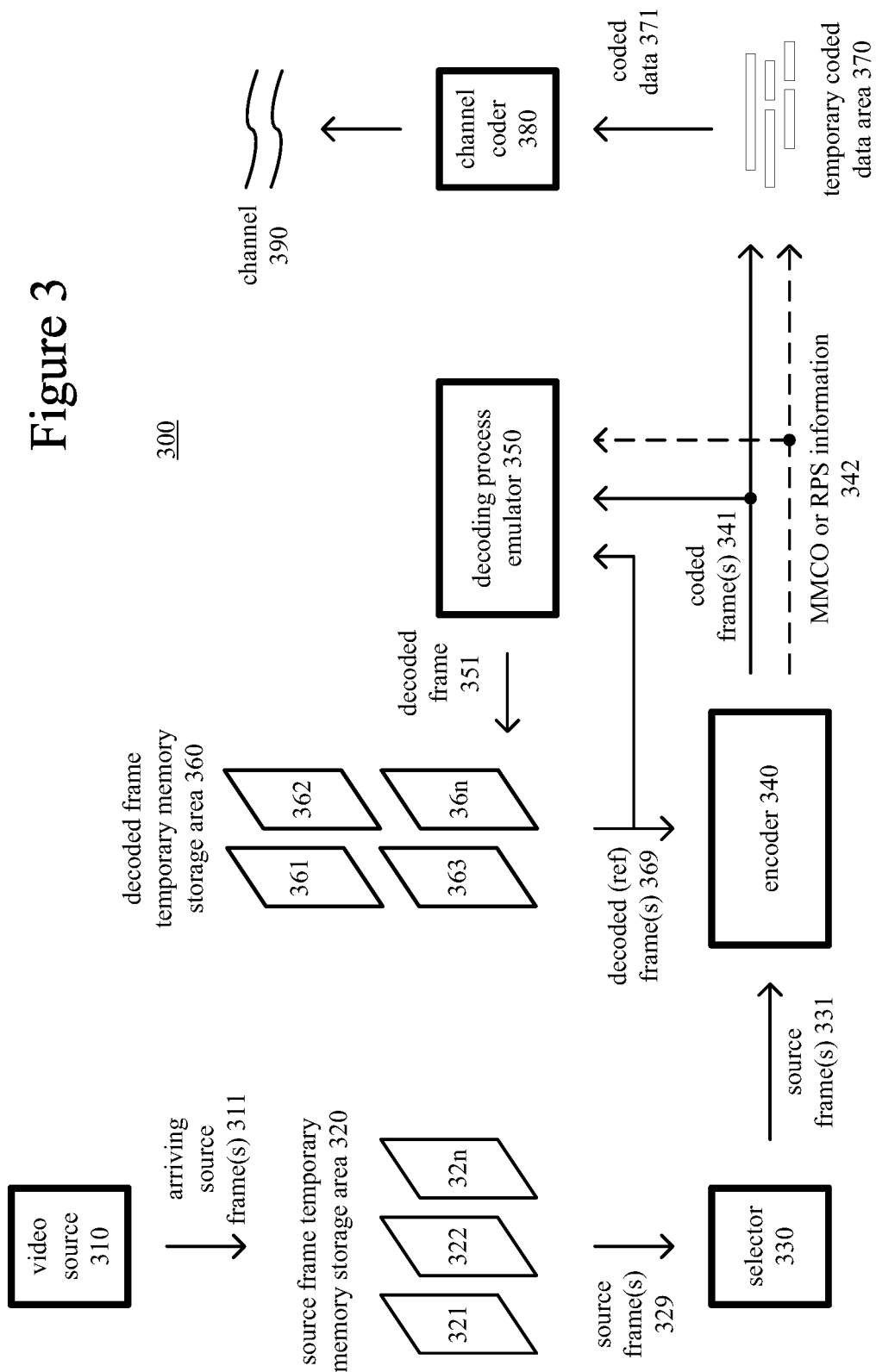

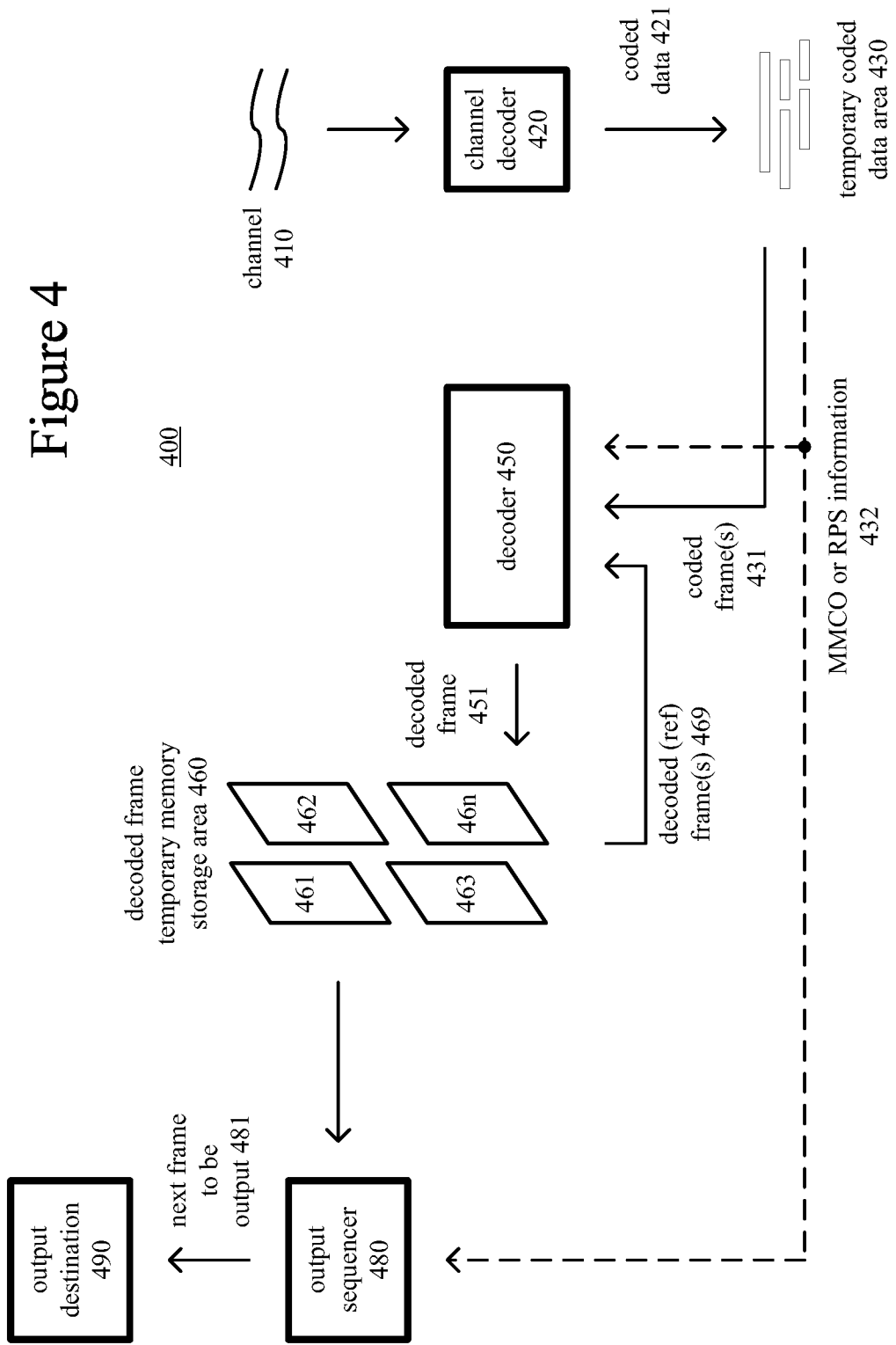

600

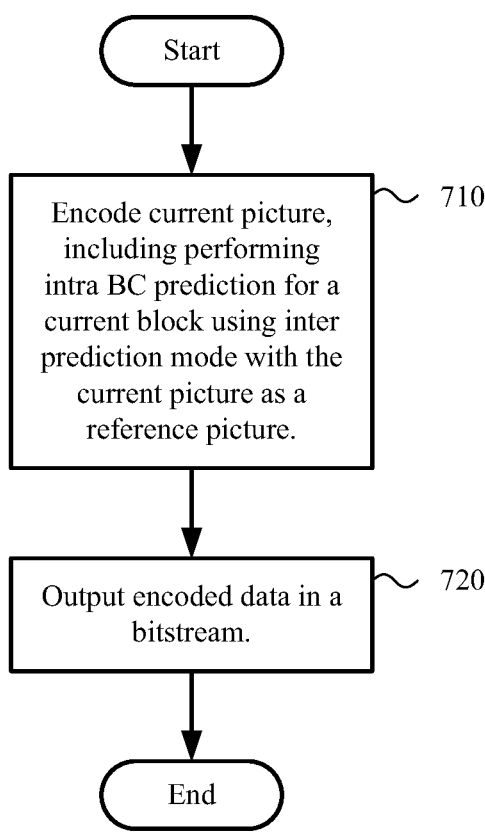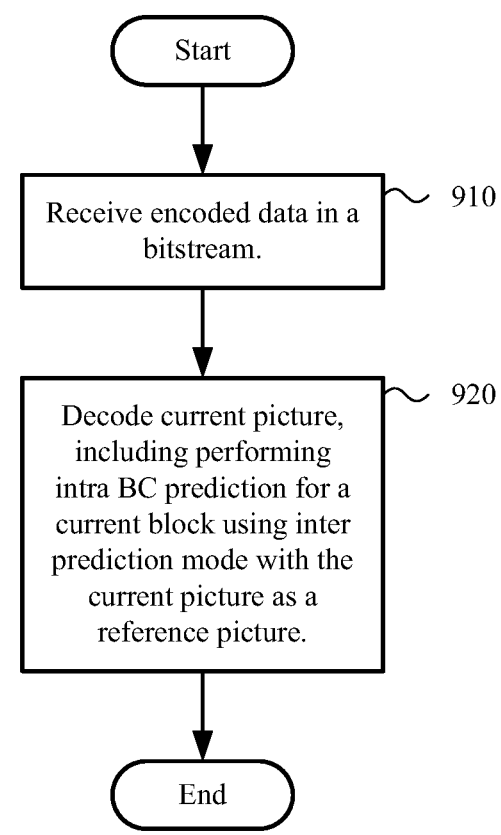

| slice_segment_header( ) { | Descriptor |
|---|---|
| ...... | |
|    if( slice_type == P \|\| slice_type == B ) { | |
|       num_ref_idx_active_override_flag | u(1) |
|       if( num_ref_idx_active_override_flag ) { | |
|          num_ref_idx_l0_active_minus1 | ue(v) |
|          if( slice_type == B ) | |
|             num_ref_idx_l1_active_minus1 | ue(v) |
|       } | |
|       if( lists_modification_present_flag && NumPocTotalCurr > 1 ) | |
|          ref_pic_lists_modification( ) | |
|       if( slice_type == B ) | |
|          mvd_l1_zero_flag | u(1) |
|       if( cabac_init_present_flag ) | |
|          cabac_init_flag | u(1) |
|       if( slice_temporal_mvp_enabled_flag ) { | |
|          if( slice_type == B ) | |
|             collocated_from_l0_flag | u(1) |
|          if( ( collocated_from_l0_flag && num_ref_idx_l0_active_minus1 > 0 ) \|\| <br>           ( !collocated_from_l0_flag && num_ref_idx_l1_active_minus1 > 0 ) ) | |
|             collocated_ref_idx | ue(v) |
|       } | |
|       if( ( weighted_pred_flag && slice_type == P ) \|\| <br>        ( weighted_bipred_flag && slice_type == B ) ) | |
|          pred_weight_table( ) | |
|    } | |
|    if( slice_type == P \|\| slice_type == B \|\| intra_block_copy_enabled_flag ) { | |
|       five_minus_max_num_merge_cand | ue(v) |
|    } | |
|    slice_qp_delta | se(v) |
|    if( pps_slice_chroma_qp_offsets_present_flag ) { | |
|       slice_cb_qp_offset | se(v) |
|       slice_cr_qp_offset | se(v) |
|    } | |
| ...... | |

| coding_unit( x0, y0, log2CbSize ) { | Descriptor |
|---|---|
|   if( transquant_bypass_enabled_flag ) | |
|     cu_transquant_bypass_flag | ae(v) |
|   if( slice_type != I \|\| intra_block_copy_enabled_flag) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( slice_type != I \|\| intra_block_copy_enabled_flag) | |
|       pred_mode_flag | ae(v) |
|     if( CuPredMode[ x0 ][ y0 ] != MODE_INTRA \|\| log2CbSize = = MinCbLog2SizeY ) | |
|       part_mode | ae(v) |
|     if( CuPredMode[ x0 ][ y0 ] = = MODE_INTRA ) { | |
|       if( PartMode = = PART_2Nx2N && pcm_enabled_flag && <br>         log2CbSize >= Log2MinIpcmCbSizeY && <br>         log2CbSize <= Log2MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( x0, y0, log2CbSize ) | |
|     } else { | |
|       pbOffset = ( PartMode = = PART_NxN ) ? ( nCbS / 2 ) : nCbS | |
|       for( j = 0; j < nCbS; j = j + pbOffset ) | |
|         for( i = 0; i < nCbS; i = i + pbOffset ) | |
|           prev_intra_luma_pred_flag[ x0 + i ][ y0 + j ] | ae(v) |
|       for( j = 0; j < nCbS; j = j + pbOffset ) | |
|         for( i = 0; i < nCbS; i = i + pbOffset ) | |
|           if( prev_intra_luma_pred_flag[ x0 + i ][ y0 + j ] ) | |
|             mpm_idx[ x0 + i ][ y0 + j ] | ae(v) |
|           else | |
|             rem_intra_luma_pred_mode[ x0 + i ][ y0 + j ] | ae(v) |
|       if( ChromaArrayType = = 3 ) | |
|         for( j = 0; j < nCbS; j = j + pbOffset ) | |
|           for( i = 0; i < nCbS; i = i + pbOffset ) | |
|             intra_chroma_pred_mode[ x0 + i ][ y0 + j ] | ae(v) |
|       else if( ChromaArrayType != 0 ) | |

| | |
|---|---|
| intra_chroma_pred_mode[ x0 ][ y0 ] | ae(v) |
| } | |
| } else { | |
|   if( PartMode = = PART_2Nx2N ) | |
|     prediction_unit( x0, y0, nCbS, nCbS ) | |
|   else if( PartMode = = PART_2NxN ) { | |
|     prediction_unit( x0, y0, nCbS, nCbS / 2 ) | |
|     prediction_unit( x0, y0 + ( nCbS / 2 ), nCbS, nCbS / 2 ) | |
|   } else if( PartMode = = PART_Nx2N ) { | |
|     prediction_unit( x0, y0, nCbS / 2, nCbS ) | |
|     prediction_unit( x0 + ( nCbS / 2 ), y0, nCbS / 2, nCbS ) | |
|   } else if( PartMode = = PART_2NxnU ) { | |
|     prediction_unit( x0, y0, nCbS, nCbS / 4 ) | |
|     prediction_unit( x0, y0 + ( nCbS / 4 ), nCbS, nCbS * 3 / 4 ) | |
|   } else if( PartMode = = PART_2NxnD ) { | |
|     prediction_unit( x0, y0, nCbS, nCbS * 3 / 4 ) | |
|     prediction_unit( x0, y0 + ( nCbS * 3 / 4 ), nCbS, nCbS / 4 ) | |
|   } else if( PartMode = = PART_nLx2N ) { | |
|     prediction_unit( x0, y0, nCbS / 4, nCbS ) | |
|     prediction_unit( x0 + ( nCbS / 4 ), y0, nCbS * 3 / 4, nCbS ) | |
|   } else if( PartMode = = PART_nRx2N ) { | |
|     prediction_unit( x0, y0, nCbS * 3 / 4, nCbS ) | |
|     prediction_unit( x0 + ( nCbS * 3 / 4 ), y0, nCbS / 4, nCbS ) | |
|   } else { /* PART_NxN */ | |
|     prediction_unit( x0, y0, nCbS / 2, nCbS / 2 ) | |
|     prediction_unit( x0 + ( nCbS / 2 ), y0, nCbS / 2, nCbS / 2 ) | |
|     prediction_unit( x0, y0 + ( nCbS / 2 ), nCbS / 2, nCbS / 2 ) | |
|     prediction_unit( x0 + ( nCbS / 2 ), y0 + ( nCbS / 2 ), nCbS / 2, nCbS / 2 ) | |
|   } | |
| } | |
| if( !pcm_flag[ x0 ][ y0 ] ) { | |
|   if( CuPredMode[ x0 ][ y0 ] != MODE_INTRA && <br>     !( PartMode = = PART_2Nx2N && merge_flag[ x0 ][ y0 ] ) ) | |
|     rqt_root_cbf | ae(v) |
|   if( rqt_root_cbf ) { | |
|     MaxTrafoDepth = ( CuPredMode[ x0 ][ y0 ] = = MODE_INTRA ? <br>         ( max_transform_hierarchy_depth_intra + IntraSplitFlag ) : <br>         max_transform_hierarchy_depth_inter ) | |
|     transform_tree( x0, y0, x0, y0, log2CbSize, 0, 0 ) | |
|   } | |
|   } | |
| } | |
| } | |

Figure 14a  1401

```
rIdx = 0
while( rIdx < NumRpsCurrTempList0 ) {
        for( i = 0; i < NumPocStCurrBefore  &&  rIdx < NumRpsCurrTempList0; rIdx++, i++ )
            RefPicListTemp0[ rIdx ] = RefPicSetStCurrBefore[ i ]
        RefPicListTemp0[ rIdx ] = current picture
        rIdx ++
        for( i = 0;  i < NumPocStCurrAfter  &&  rIdx < NumRpsCurrTempList0; rIdx++, i++ )
            RefPicListTemp0[ rIdx ] = RefPicSetStCurrAfter[ i ]
        for( i = 0; i < NumPocLtCurr  &&  rIdx < NumRpsCurrTempList0; rIdx++, i++ )
            RefPicListTemp0[ rIdx ] = RefPicSetLtCurr[ i ]
}
```

Figure 14b  1402

```
rIdx = 0
while( rIdx < NumRpsCurrTempList0 ) {
        for( i = 0; i < NumPocStCurrBefore  &&  rIdx < NumRpsCurrTempList0; rIdx++, i++ )
            RefPicListTemp0[ rIdx ] = RefPicSetStCurrBefore[ i ]
        for( i = 0;  i < NumPocStCurrAfter  &&  rIdx < NumRpsCurrTempList0; rIdx++, i++ )
            RefPicListTemp0[ rIdx ] = RefPicSetStCurrAfter[ i ]
        RefPicListTemp0[ rIdx ] = current picture
        rIdx ++
        for( i = 0; i < NumPocLtCurr  &&  rIdx < NumRpsCurrTempList0; rIdx++, i++ )
            RefPicListTemp0[ rIdx ] = RefPicSetLtCurr[ i ]
}
```

```
rIdx = 0
while( rIdx < NumRpsCurrTempList0 ) {
        for( i = 0; i < NumPocStCurrBefore  && rIdx < NumRpsCurrTempList0; rIdx++, i++ )
            RefPicListdTemp0[ rIdx ] = RefPicSetStCurrBefore[ i ]
        for( i = 0;  i < NumPocStCurrAfter  &&  rIdx < NumRpsCurrTempList0; rIdx++, i++ )
            RefPicListTemp0[ rIdx ] = RefPicSetStCurrAfter[ i ]
        for( i = 0; i < NumPocLtCurr  &&  rIdx < NumRpsCurrTempList0; rIdx++, i++ )
            RefPicListTemp0[ rIdx ] = RefPicSetLtCurr[ i ]
        RefPicListTemp0[ rIdx ] = current picture
        rIdx ++
}
```

UNIFIED INTRA BLOCK COPY AND INTER PREDICTION MODES

CROSS REFERENCE TO RELATED APPLICATIONS

This application is a continuation of U.S. patent application Ser. No. 15/319,797, filed Dec. 18, 2016, which is the U.S. National Stage of International Application No. PCT/CN2014/080302, filed Jun. 19, 2014, which was published in English under PCT Article 21(2), the disclosure of which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the HEVC standard (ITU-T H.265 or ISO/IEC 23008-2) has been approved. Extensions to the HEVC standard (e.g., for scalable video coding/decoding, for coding/decoding of video with higher fidelity in terms of sample bit depth or chroma sampling rate, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

In general, video compression techniques include "intra-picture" compression and "inter-picture" compression. Intra-picture compression techniques compress individual pictures, and inter-picture compression techniques compress pictures with reference to a preceding and/or following picture (often called a reference or anchor picture) or pictures.

Inter-picture compression techniques often use motion estimation and motion compensation to reduce bit rate by exploiting temporal redundancy in a video sequence. Motion estimation is a process for estimating motion between pictures. In one common technique, an encoder using motion estimation attempts to match a current block of sample values in a current picture with a candidate block of the same size in a search area in another picture, the reference picture. When the encoder finds an exact or "close enough" match in the search area in the reference picture, the encoder parameterizes the change in position between the current and candidate blocks as motion data (such as a motion vector ("MV")). An MV is conventionally a two-dimensional value, having a horizontal MV component that indicates left or right spatial displacement and a vertical MV component that indicates up or down spatial displacement. An MV can indicate an integer-pixel displacement or, in some codec formats, a fractional-pixel displacement. In general, motion compensation is a process of reconstructing pictures from reference picture(s) using motion data.

Intra block copy ("BC") is a prediction mode under development for HEVC extensions. For intra BC prediction mode, the sample values of a current block of a current picture are predicted using previously reconstructed sample values in the same picture. A block vector ("BV") indicates a displacement from the current block to a region of the current picture that includes the previously reconstructed sample values used for prediction. Typically, a BV indicates an integer-pixel displacement. The BV is signaled in the bitstream. Intra BC prediction is a form of intra-picture prediction—intra BC prediction for a block of a picture does not use any sample values other than sample values in the same picture.

As currently specified in draft extensions for the HEVC standard and implemented in some reference software for the HEVC standard, intra BC prediction mode has several problems. In particular, the added complexity of implementing intra BC prediction mode during encoding and decoding (in additional to regular intra prediction modes and inter prediction modes) may not justify including intra BC prediction as a coding/decoding tool.

SUMMARY

In summary, the detailed description presents innovations in unified intra block copy ("BC") and inter prediction modes. In some example implementations, bitstream syntax, semantics of syntax elements and many coding/decoding processes for inter prediction mode are reused or slightly modified to enable intra BC prediction for blocks of a frame. For example, to provide intra BC prediction for a current block of a current picture, a motion compensation process applies a motion vector ("MV") that indicates a displacement within the current picture, with the current picture being used as a reference picture for the motion compensation process. With this unification of syntax, semantics and coding/decoding processes, various coding/decoding tools designed for inter prediction mode can also be applied when intra BC prediction is used, which simplifies implementation of intra BC prediction.

According to one aspect of the innovations described herein, a video encoder encodes a current picture to produce encoded data. As part of the encoding, the encoder performs intra BC prediction for a current block of the current picture, where the intra BC prediction uses inter prediction mode with the current picture as a reference picture. The encoder outputs the encoded data in a bitstream. As part of the unification of intra BC prediction and inter prediction modes, the encoder can be adapted in any one or more of the following ways.

First, the encoder can determine whether to enable or disable intra BC prediction mode, then set a value of a flag in the bitstream to indicate whether the intra BC prediction mode is enabled or disabled. For example, the encoder determines whether to enable or disable intra BC prediction mode for a sequence, and the flag is part of a sequence parameter set ("SPS"). Alternatively, the encoder can determine whether to enable or disable BC prediction mode on a picture-by-picture basis, slice-by-slice basis, or some other basis.

Second, as part of the encoding, the encoder can set values of syntax elements of the bitstream such that none of the syntax elements leads to referencing of a non-reconstructed part of the current picture during the encoding the current picture. That is, even when inter prediction mode syntax, semantics, processing, etc. are used to implement intra BC prediction functionality, the encoder can set the values of syntax elements such that intra BC prediction references only previously reconstructed parts of the current picture.

Third, as part of the encoding, the encoder can use any of several different approaches to signal motion vector ("MV") information for intra BC prediction (where MVs are used as block vectors ("BVs") during encoding). For example, the encoder can identify an MV of the current block, where the MV indicates an integer-pixel offset. The encoder signals the MV in the bitstream at integer-pixel precision. Or, as another example, the encoder can identify an MV of the current block, where the MV indicates an integer-pixel offset, but signal the MV in the bitstream at a fractional-pixel precision (e.g., ¼-pixel precision). Even when luma MVs have integer-pixel precision, corresponding chroma MVs can have a fractional-pixel precision. After the encoder derives a chroma MV from a luma MV indicating an integer-pixel offset, the encoder can round or truncate the chroma MV to indicate an integer-pixel offset.

Fourth, for the encoding of the current picture, the encoder can initially mark the current picture as a long-term reference picture, then mark the current picture as a short-term reference picture after the encoding of the current picture finishes. In some example implementations, this enables intra BC prediction using the current picture as a reference picture in inter prediction mode, while limiting how the current picture affects other processes such as MV prediction and MV scaling.

Fifth, as part of the encoding, the encoder can set a coding mode that applies for the current block, choosing from among multiple available coding modes, where the coding modes include intra prediction mode, inter prediction mode and intra BC prediction mode. For example, the encoder sets the coding mode for a current coding unit. The bitstream includes a syntax element that indicates the coding mode that applies for the current block. If the coding mode that applies for the current block is the intra BC prediction mode, syntax elements for the current block follow syntax for the inter prediction mode, except that inter prediction direction and a reference picture index are inferred. In this case (coding mode that applies for the current block is intra BC prediction mode), prediction direction is not needed, and the reference picture is known to be the current picture.

Sixth, as part of the encoding, when the current block is part of a current slice that is an I slice, the encoder can set a counter that indicates a number of reference pictures active for the current slice. In particular, in this situation (current slice is I slice), the counter indicates a single reference picture is active when intra BC prediction mode is enabled. A value of a syntax element in the bitstream can indicate the number of reference pictures active for the current slice.

Seventh, as part of the encoding, the encoder can add the current picture to a reference picture list ("RPL"). For example, the encoder adds the current picture at a last position of the RPL, and increments a counter that indicates a number of reference pictures active for a current slice that includes the current block. If the current slice is a P slice or a B slice, the encoder can add the current picture to the RPL after invocation of a list construction process in which one or more other reference pictures are added to the RPL. Alternatively, if the current slice is a P slice or a B slice, the encoder can add the current picture to the RPL during a list construction process in which one or more other reference pictures are added to the RPL.

Eighth, as part of the encoding, when the current block is part of a current slice that is a B slice, the encoder can combine, as prediction results from two different reference pictures, the results of the intra BC prediction for the current block and results of motion-compensated prediction for the current block. This allows the encoder to blend results of intra BC prediction and results of motion-compensated prediction for the current block. Alternatively, combining of results of intra BC prediction and results of motion-compensated prediction is not allowed.

Ninth, as part of the inter prediction mode processing for the current block, the encoder can perform intra BC prediction on 4×4 blocks. For example, if (a) the reference picture is the current picture and (b) the prediction direction is uni-predictive (from the RPL that includes the current picture), the encoder can use 4×4 block size (for intra BC prediction). In some example implementations, this permits intra BC prediction down to the smallest block size that is allowed for spatial intra prediction. When block size for inter prediction mode is signaled before a reference picture indicator (e.g., when block size (partition mode) is signaled for a CU, but prediction directions and reference picture indices are signaled for PUs of the CU), the encoder can make the decision about block size considering, among other factors, reference pictures and prediction directions used for blocks. Then, when the block size that applies for a current block is 4×4, the encoder can skip signaling of syntax elements for prediction direction and reference picture index for the current block, since the prediction direction can only be uni-predictive (from the RPL that includes the current picture) and the reference picture can only be the current picture. Alternatively, in this situation, the encoder disables 4×4 block size for intra BC prediction.

Tenth, as part of the encoding, the encoder can use advanced MV prediction mode, merge mode, skip mode and/or another coding tool that is part of inter prediction mode. By reusing such coding tools, implementation of intra BC prediction is simplified.

Eleventh, as part of the inter prediction mode processing for the current block, the encoder can perform merge mode processing for the current block. For example, for each of one or more merge mode candidate, the encoder obtains the merge mode candidate and checks whether the merge mode candidate references the current picture. If so, the encoder retains the merge mode candidate. Otherwise, the encoder excludes the merge mode candidate. Later, if the number of retained merge mode candidates is less than the number of allowed merge mode candidates, the encoder can add one or more pre-defined merge mode candidates.

Twelfth, when the current block is part of a current slice that is an I slice, the encoder can set values of syntax elements and output the syntax elements in different ways depending on whether intra BC prediction mode is enabled. For example, if intra BC prediction mode is enabled, the syntax elements for the current I slice follow syntax for a P slice or B slice, but if the intra BC prediction mode is not enabled, the syntax elements for the current I slice follow default syntax for an I slice. In this way, syntax for inter prediction mode can be reused for intra BC prediction, which simplifies implementation.

Thirteenth, when the current block is part of a current slice that is an I slice, if intra BC prediction mode is enabled, the encoder can disable temporal MV prediction for the current I slice. This can streamline encoding by simplifying MV prediction and avoiding MV scaling, and by avoiding using information in another picture/slice when encoding the current I slice.

Fourteenth, when the current block is part of a current slice that is a B slice, and the current picture is added to one of a first RPL and a second RPL, the encoder can evaluate whether, aside from the current picture, (a) the number of reference pictures in the first RPL matches the number of reference pictures in the second RPL, and (b) each of the reference pictures in the first RPL is also represented at a corresponding position in the second RPL. Depending on the results of the evaluating, the encoder can set a value of a syntax element in the bitstream that indicates whether only zero-value MV differentials are allowed when the second RPL is used in bidirectional inter prediction for blocks of the B slice.

According to another aspect of the innovations described herein, a video decoder receives encoded data in a bitstream. The video decoder decodes a current picture using the encoded data. As part of the decoding, the video decoder performs intra BC prediction for a current block of the current picture, where the intra BC prediction uses inter prediction mode with the current picture as a reference picture. As part of the unification of intra BC prediction and inter prediction modes, the decoder can be adapted in any one or more of the following ways.

First, the decoder can receive a flag in the bitstream that indicates whether intra BC prediction mode is enabled or disabled, then enable or disable the intra BC prediction mode accordingly. For example, the flag is part of a SPS, and the decoder enables or disables the intra prediction mode for a sequence. Alternatively, the decoder can enable or disable BC prediction mode on a picture-by-picture basis, slice-by-slice basis, or some other basis, with the flag signaled at an appropriate layer of bitstream syntax.

Second, the bitstream can be constrained to include no syntax elements that lead to referencing of a non-reconstructed part of the current picture during the decoding the current picture. That is, even when inter prediction mode syntax, semantics, processing, etc. are used to implement intra BC prediction functionality, the values of syntax elements are set such that intra BC prediction references only previously reconstructed parts of the current picture.

Third, as part of the decoding, the decoder can use any of several different approaches to reconstructing MV information for intra BC prediction (where MVs are used as BVs during decoding). For example, the decoder can reconstruct an MV of the current block, where the MV indicates an integer-pixel offset and is signaled in the bitstream at integer-pixel precision. As part of the reconstructing, the decoder scales the MV to a fractional-pixel precision before use of the MV in a motion compensation process. Or, as another example, the decoder can reconstruct an MV of the current block, where the MV indicates an integer-pixel offset but is signaled in the bitstream at a fractional-pixel precision (e.g., ¼-pixel precision). Even when luma MVs have integer-pixel precision, corresponding chroma MVs can have a fractional-pixel precision. After the decoder derives a chroma MV from a luma MV indicating an integer-pixel offset, the decoder can round or truncate the chroma MV to indicate an integer-pixel offset.

Fourth, for the decoding of the current picture, the decoder can initially mark the current picture as a long-term reference picture, then mark the current picture as a short-term reference picture after the decoding of the current picture finishes. In some example implementations, this enables intra BC prediction using the current picture as a reference picture in inter prediction mode, while limiting how the current picture affects other processes such as MV prediction and MV scaling.

Fifth, as part of the decoding, the decoder can parse, from the bitstream, a syntax element that indicates a coding mode that applies for the current block, then set the coding mode. The coding mode can be selected from among multiple available coding modes, including intra prediction mode, inter prediction mode and intra BC prediction mode. For example, the decoder sets the coding mode for a current coding unit. If the coding mode that applies for the current block is the intra BC prediction mode, syntax elements for the current block follow syntax for the inter prediction mode, except that inter prediction direction and a reference picture index are inferred. In this case (coding mode that applies for the current block is intra BC prediction mode), prediction direction is not needed, and the reference picture is known to be the current picture.

Sixth, as part of the decoding, when the current block is part of a current slice that is an I slice, the decoder can set a counter that indicates a number of reference pictures active for the current slice. In particular, in this situation (current slice is I slice), the counter indicates a single reference picture is active when intra BC prediction mode is enabled. A value of a syntax element in the bitstream can indicate the number of reference pictures active for the current slice.

Seventh, as part of the decoding, the decoder can add the current picture to an RPL. For example, the decoder adds the current picture at a last position of the RPL, and increments a counter that indicates a number of reference pictures active for a current slice that includes the current block. If the current slice is a P slice or a B slice, the decoder can add the current picture to the RPL after invocation of a list construction process in which one or more other reference pictures are added to the RPL. Alternatively, if the current slice is a P slice or a B slice, the decoder can add the current picture to the RPL during a list construction process in which one or more other reference pictures are added to the RPL.

Eighth, as part of the decoding, when the current block is part of a current slice that is a B slice, the decoder can combine, as prediction results from two different reference pictures, the results of the intra BC prediction for the current block and results of motion-compensated prediction for the current block. This allows the decoder to blend results of intra BC prediction and results of motion-compensated prediction for the current block. Alternatively, combining of results of intra BC prediction and results of motion-compensated prediction is not allowed.

Ninth, as part of the inter prediction mode processing for the current block, the decoder can perform intra BC prediction on 4×4 blocks. For example, if (a) the reference picture is the current picture and (b) the prediction direction is uni-predictive (from the RPL that includes the current picture), the decoder can use 4×4 block size (for intra BC prediction). In some example implementations, this permits intra BC prediction down to the smallest block size that is allowed for spatial intra prediction. When block size for inter prediction mode is signaled before a reference picture indicator (e.g., when block size (partition mode) is signaled for a CU, but prediction directions and reference picture indices are signaled for PUs of the CU), the decoder parses a syntax element for the block size without knowing prediction direction or reference picture index for a current block, and hence without knowing whether the block uses intra BC prediction or inter-picture prediction. If the block size is 4×4, however, the decoder can skip parsing of syntax elements for the prediction direction and reference picture index for the current block. When the block size that applies for a current block is 4×4, the prediction direction for the current block can only be uni-predictive (from the RPL that includes the current picture), and the reference picture for the current block can only be the current picture, so syntax elements for prediction direction and reference picture index for the current block are omitted from the bitstream. Alternatively, in this situation, the decoder disables 4×4 block size for intra BC prediction.

Tenth, as part of the decoding, the decoder can use advanced MV prediction mode, merge mode, skip mode and/or another coding/decoding tool that is part of inter prediction mode. By reusing such coding/decoding tools, implementation of intra BC prediction is simplified.

Eleventh, as part of the inter prediction mode processing for the current block, the decoder can perform merge mode processing for the current block. For example, for each of one or more merge mode candidates, the decoder obtains the merge mode candidate and checks whether the merge mode candidate references the current picture. If so, the decoder retains the merge mode candidate. Otherwise, the decoder excludes the merge mode candidate. Later, if the number of retained merge mode candidates is less than the number of allowed merge mode candidates, the decoder can add one or more pre-defined merge mode candidates.

Twelfth, when the current block is part of a current slice that is an I slice, the decoder can parse syntax elements in different ways depending on whether intra BC prediction mode is enabled. For example, if intra BC prediction mode is enabled, the syntax elements for the current I slice follow syntax for a P slice or B slice, but if the intra BC prediction mode is not enabled, the syntax elements for the current I slice follow default syntax for an I slice. In this way, syntax for inter prediction mode can be reused for intra BC prediction, which simplifies implementation.

Thirteenth, when the current block is part of a current slice that is an I slice, if intra BC prediction mode is enabled, the decoder can disable temporal MV prediction for the current I slice. This can streamline decoding by simplifying MV prediction and avoiding MV scaling, and by avoiding using information in another picture/slice when decoding the current I slice.

Fourteenth, as part of the decoding, when the current block is part of a current slice that is an I slice, if intra BC prediction mode is enabled, the decoder decodes the current slice like a P slice or B slice. By reusing coding/decoding tools, implementation of intra BC prediction is simplified.

The innovations for unified intra BC and inter prediction modes can be implemented as part of a method, as part of a computing device adapted to perform the method or as part of a tangible computer-readable media storing computer-executable instructions for causing a computing device to perform the method. The various innovations can be used in combination or separately. For example, selectively enabling/disabling intra BC prediction mode can be used in combination with any of the reference picture management approaches described herein (for RPL construction and/or reference picture marking), or the selective enabling/disabling of intra BC prediction mode or a reference picture management approach can be used separately. Any of the approaches described herein for signaling or reconstructing MV information can be used separately or in combination with a preceding tool or combination. Any of the approaches described herein for compound prediction can be used separately or in combination with a preceding tool or combination. Any of the approaches described herein for intra BC prediction with 4×4 blocks can be used separately or in combination with a preceding tool or combination. Any of the approaches described herein for intra BC prediction that uses advanced MV prediction mode, merge mode, skip mode or another coding/decoding tool of inter prediction mode, with temporal MV prediction enabled or disabled, can be used separately or in combination with a preceding tool or combination. Any of the approaches described herein for intra BC prediction that uses inter prediction mode syntax, semantics or coding/decoding processes can be used separately or in combination with a preceding tool or combination.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIG. 4 is a diagram of an example decoder system in conjunction with which some described embodiments can be implemented.

FIG. 7 is a flowchart illustrating a generalized technique for encoding that includes unified intra BC and inter prediction modes.

FIG. 9 is a flowchart illustrating a generalized technique for decoding that includes unified intra BC and inter prediction modes.

FIGS. 11a-11c are diagrams illustrating example syntax structures for unified intra BC and inter prediction modes in some example implementations.

FIGS. 14a-14c are pseudocode listings illustrating ways to add a current picture during the process of constructing an RPL.

DETAILED DESCRIPTION

The detailed description presents innovations in unified intra block copy ("BC") and inter prediction modes during video encoding or video decoding.

Some of the innovations described herein are illustrated with reference to syntax elements and operations specific to the HEVC standard. The innovations described herein can also be implemented for other standards or formats. Although operations described herein are in places described as being performed by a video encoder or video decoder, in many cases the operations can be performed by another type of media processing tool.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
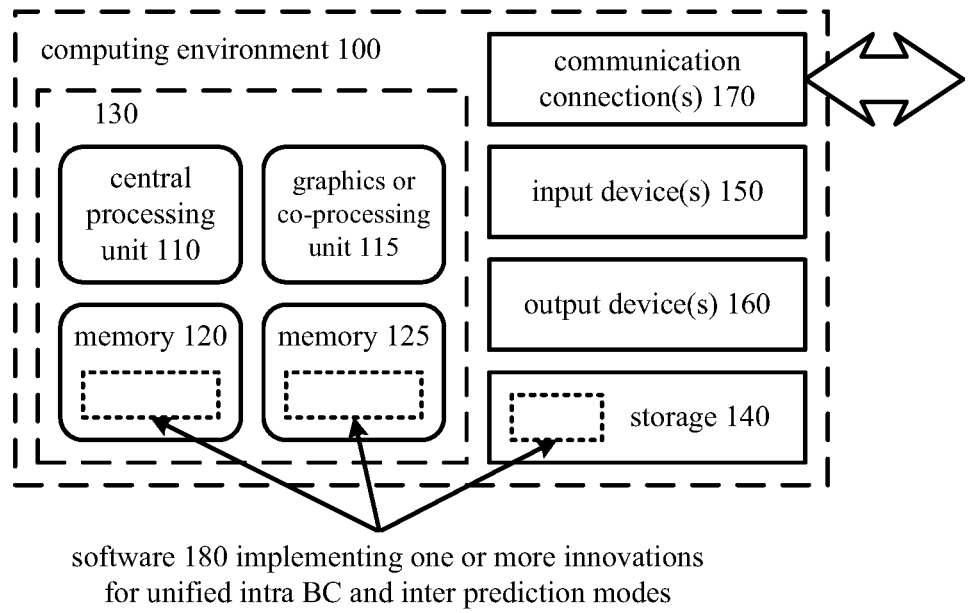
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for unified intra BC and inter prediction modes, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for unified intra BC and inter prediction modes.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
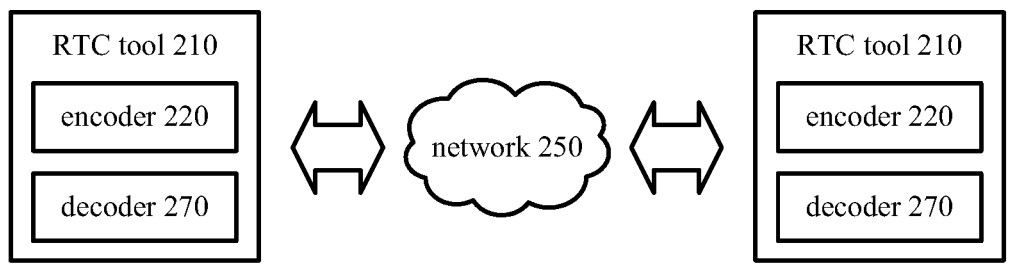
FIGS. 2a and 2b are diagrams of example network environments in which some described embodiments can be implemented.
Figure 2B:
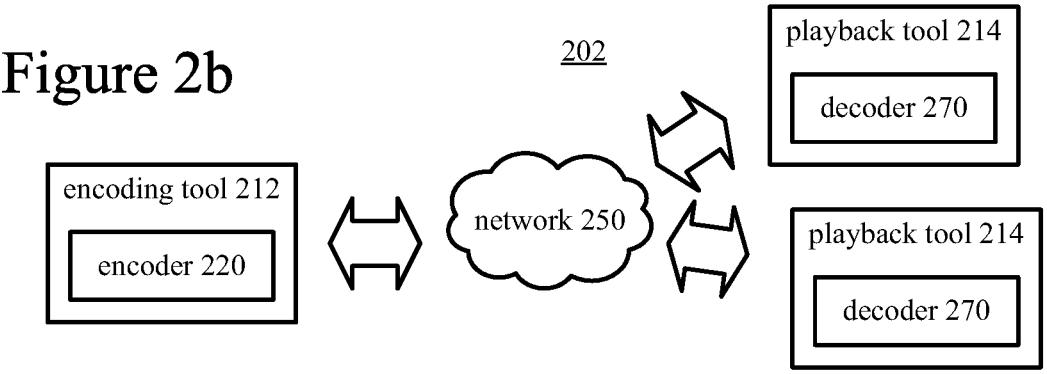

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the HEVC standard (also known as H.265), SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, screen capture module, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using unified intra BC and inter prediction modes.

The video source (310) can be a camera, tuner card, storage media, screen capture module, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Typically, before encoding, video has been converted to a color space such as YUV, in which sample values of a luma (Y) component represent brightness or intensity values, and sample values of chroma (U, V) components represent color-difference values. The chroma sample values may be sub-sampled to a lower chroma sampling rate (e.g., for YUV 4:2:0 format or YUV 4:2:2), or the chroma sample values may have the same resolution as the luma sample values (e.g., for YUV 4:4:4 format). In YUV 4:2:0 format, chroma components are downsampled by a factor of two horizontally and by a factor of two vertically. In YUV 4:2:2 format, chroma components are downsampled by a factor of two horizontally. Or, the video can be encoded in another format (e.g., RGB 4:4:4 format).

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area.

Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of HEVC format (H.265), Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of samples for purposes of encoding and decoding.

For syntax according to the HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU can have a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. As used herein, the term "block" can indicate a CB, PB, TB or other set of sample values, depending on context. The encoder decides how to partition video into CTUs, CUs, PUs, TUs, etc.

Returning to FIG. 3, the encoder represents an intra-coded block of a source frame (331) in terms of prediction from other, previously reconstructed sample values in the frame (331). For intra BC prediction, a motion estimator (using the current frame as a reference frame) estimates displacement of a block with respect to the other, previously reconstructed sample values. An intra-frame prediction reference region (or intra-prediction region, for short) is a region of samples in the frame that are used to generate BC-prediction values for the block. The intra-frame prediction region can be indicated with a block vector ("BV") value (which is signaled and applied as motion vector ("MV") information). For intra spatial prediction for a block, the intra-picture estimator estimates extrapolation of the neighboring reconstructed sample values into the block. The intra-picture estimator (or motion estimator) can output prediction information (such as MV information for intra BC prediction or prediction mode (direction) for intra spatial prediction), which is entropy coded. An intra-picture prediction predictor applies spatial prediction information to determine intra prediction values. A motion compensator (using the current frame as a reference frame) applies the MV information to determine intra BC prediction values.

The encoder (340) represents an inter-frame coded, predicted block of a source frame (331) in terms of prediction from reference frames. A motion estimator estimates the motion of the block with respect to one or more reference frames (369). When multiple reference frames are used, the multiple reference frames can be from different temporal directions or the same temporal direction. A motion-compensated prediction reference region is a region of samples in the reference frame(s) that are used to generate motion-compensated prediction values for a block of samples of a current frame. The motion estimator outputs motion information such as MV information, which is entropy coded. A motion compensator applies MV values to reference frames (369) to determine motion-compensated prediction values for inter-frame prediction.

The encoder can determine the differences (if any) between a block's prediction values (intra or inter) and corresponding original values. These prediction residual values are further encoded using a frequency transform, quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, selected MV precision, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

An adaptive deblocking filter is included within the motion compensation loop in the encoder (340) to smooth discontinuities across block boundary rows and/or columns in a decoded frame. Other filtering (such as de-ringing filtering, adaptive loop filtering ("ALF"), or sample-adaptive offset ("SAO") filtering; not shown) can alternatively or additionally be applied as in-loop filtering operations.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding process emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Decoder Systems.

FIG. 4 is a block diagram of an example decoder system (400) in conjunction with which some described embodiments can be implemented. The decoder system (400) can be a general-purpose decoding tool capable of operating in any of multiple decoding modes such as a low-latency decoding mode for real-time communication and a higher-latency decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include content encoded using unified intra BC and inter prediction modes.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0|ISO/IEC 13818-1 or an internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, intra-frame prediction, motion-compensated inter-frame prediction, inverse quantization, inverse frequency transforms, and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. Based on side information, the motion compensator can determine a selected MV precision (e.g., integer-pixel MV precision, ½-pixel MV precision, or ¼-pixel MV precision). The motion compensator can then apply MVs having the selected MV precision. An intra-frame prediction module can spatially predict sample values of a current block from neighboring, previously reconstructed sample values. Or, for intra BC prediction, the motion compensator can predict sample values of a current block using previously reconstructed sample values of an intra-frame prediction region in the current frame, as a reference frame. The intra-frame prediction region can be indicated with an MV value. The decoder (450) also reconstructs prediction residual values. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency-domain data into spatial-domain data. For an inter-frame predicted block, the decoder (450) combines reconstructed prediction residual values with motion-compensated prediction values. The decoder (450) can similarly combine prediction residual values with prediction values from intra-frame prediction. An adaptive deblocking filter is included within the motion compensation loop in the video decoder (450) to smooth discontinuities across block boundary rows and/or columns in the decoded frame (451). Other filtering (such as de-ringing filtering, ALF, or SAO filtering; not shown) can alternatively or additionally be applied as in-loop filtering operations.

The decoded frame temporary memory storage area (460) includes multiple frame buffer storage areas (461, 462, . . . , 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) identifies when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders.

Figure 5A:
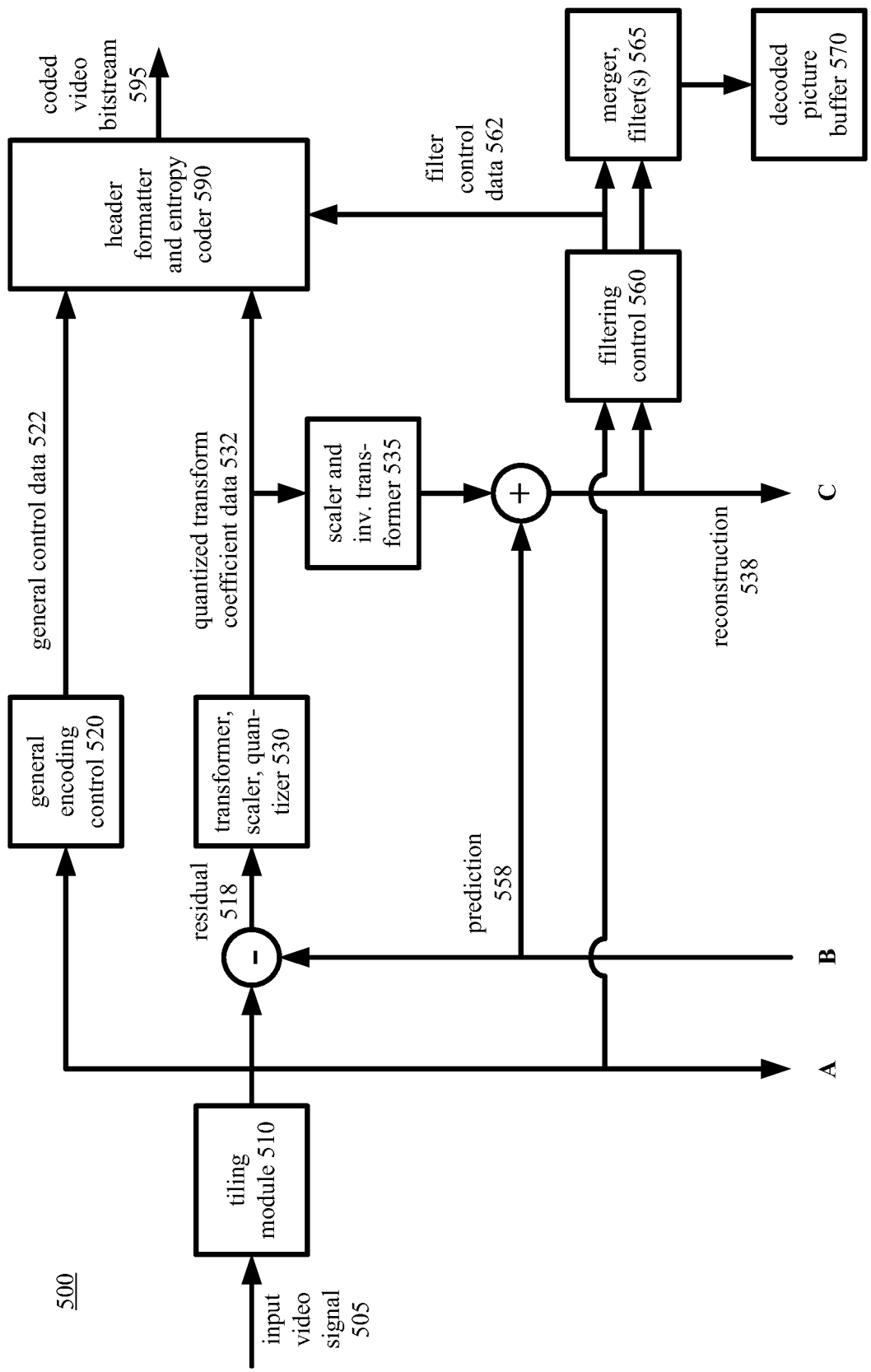
FIGS. 5a and 5b are diagrams illustrating an example video encoder in conjunction with which some described embodiments can be implemented.
Figure 5B:
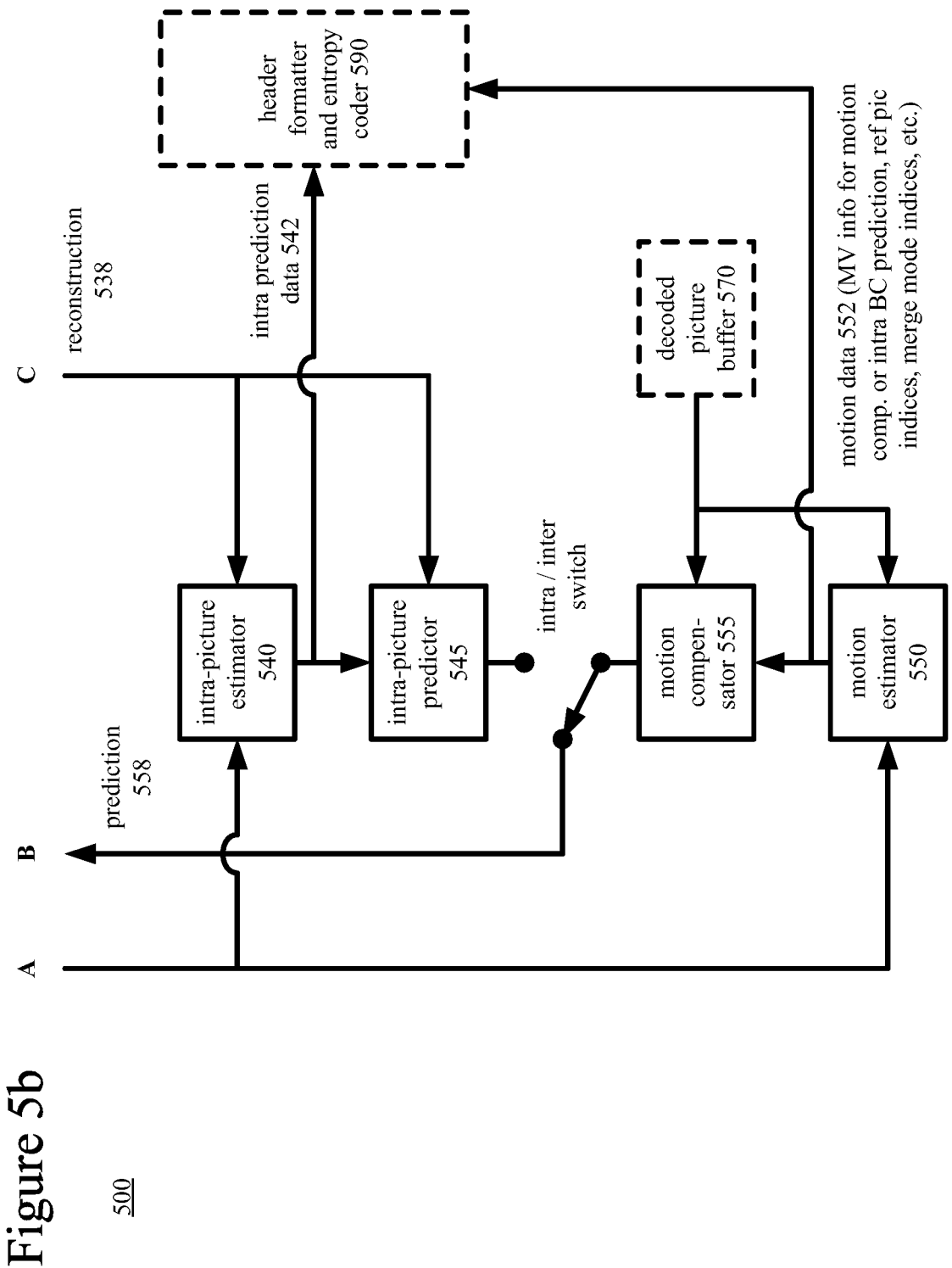

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, in conjunction with the motion estimator (550), the general encoding control (520) can manage intra BC prediction and inter prediction. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction or intra BC prediction, a motion estimator (550) estimates the motion (or displacement) of blocks of sample values of the current picture of the input video signal (505) with respect to one or more reference pictures. For intra BC prediction, the reference picture is the current picture, and the motion estimator (550) estimates displacement of the sample values of a current block to different candidate regions within the current picture. The motion estimator (550) can select a motion vector ("MV") precision (e.g., integer-pixel MV precision, ½-pixel MV precision, or ¼-pixel MV precision), then use the selected MV precision during motion estimation. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as MV data (including MV values indicating displacements for intra BC prediction), merge mode index values and reference picture selection data, as well as side information that indicates the selected MV precision. The side information including motion data (552) is provided to the header formatter/entropy coder (590) as well as the motion compensator (555).

The motion compensator (555) applies MV values having the selected MV precision to the reconstructed reference picture(s) from the decoded picture buffer (570). Or, for intra BC prediction, the motion compensator (555) applies MV values to reconstructed parts of the current picture as a reference picture, to predict sample values for blocks of the current picture. When the chroma data for a picture has the same resolution as the luma data (e.g. when the format is YUV 4:4:4 format or RGB 4:4:4 format), the MV value that is applied for a chroma block may be the same as the MV value applied for the luma block. On the other hand, when the chroma data for a picture has reduced resolution relative to the luma data (e.g. when the format is YUV 4:2:0 format or YUV 4:2:2 format), the MV value that is applied for a chroma block may be scaled down and possibly rounded to adjust for the difference in chroma resolution (e.g., for YUV 4:2:0 format, by dividing the vertical and horizontal components of the MV value by two and truncating or rounding them to integer-pixel offsets; for YUV 4:2:2 format, by dividing the horizontal component of the MV value by two and truncating or rounding it to an integer-pixel offset). The motion compensator (555) produces motion-compensated predictions for the current picture and, for intra BC prediction, intra BC prediction values for the current picture.

In a separate path within the encoder (500), an intra-picture estimator (540) determines how to perform spatial intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture. The intra-picture estimator (540) produces as side information intra prediction data (542), such as prediction mode direction (for intra spatial prediction). The intra prediction data (542) is provided to the header formatter/ entropy coder (590) as well as the intra-picture predictor (545).

According to the intra prediction data (542), the intra-picture predictor (545) spatially predicts sample values of a current block of the current picture from neighboring, previously reconstructed sample values of the current picture.

The intra/inter switch selects values of a motion-compensated prediction or intra-picture prediction for use as the prediction (558) for a given block. The difference (if any) between a block of the prediction (558) and a corresponding part of the original current picture of the input video signal (505) provides values of the residual (518). During reconstruction of the current picture, reconstructed residual values are combined with the prediction (558) to produce a reconstruction (538) of the original content from the video signal (505). In lossy compression, however, some information is still lost from the video signal (505).

In the transformer/scaler/quantizer (530), a frequency transformer converts spatial-domain video data into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The encoder (500) may also be able to indicate that such transform step is skipped. The scaler/quantizer scales and quantizes the transform coefficients. For example, the quantizer applies dead-zone scalar quantization to the frequency-domain data with a quantization step size that varies on a frame-by-frame basis, tile-by-tile basis, slice-by-slice basis, block-by-block basis, frequency-specific basis or other basis. The quantized transform coefficient data (532) is provided to the header formatter/entropy coder (590).

In the scaler/inverse transformer (535), a scaler/inverse quantizer performs inverse scaling and inverse quantization on the quantized transform coefficients. An inverse frequency transformer performs an inverse frequency transform, producing blocks of reconstructed prediction residual values or sample values. The encoder (500) combines reconstructed residual values with values of the prediction (558) (e.g., motion-compensated prediction values, intra-picture prediction values) to form the reconstruction (538).

For spatial intra-picture prediction, the values of the reconstruction (538) can be fed back to the intra-picture estimator (540) and intra-picture predictor (545). Also, the values of the reconstruction (538) can be used for motion-compensated prediction of subsequent pictures, or for intra BC prediction using the current picture as a reference picture. The values of the reconstruction (538) can be further filtered. A filtering control (560) determines how to perform deblock filtering and SAO filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). MV values can be predictively coded. For example, the header formatter/entropy coder (590) uses Exponential-Golomb coding for entropy coding of various syntax elements such as syntax elements for differential MV values, after MV prediction.

The header formatter/entropy coder (590) provides the encoded data in the coded video bitstream (595). The format of the coded video bitstream (595) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders.

Figure 6:
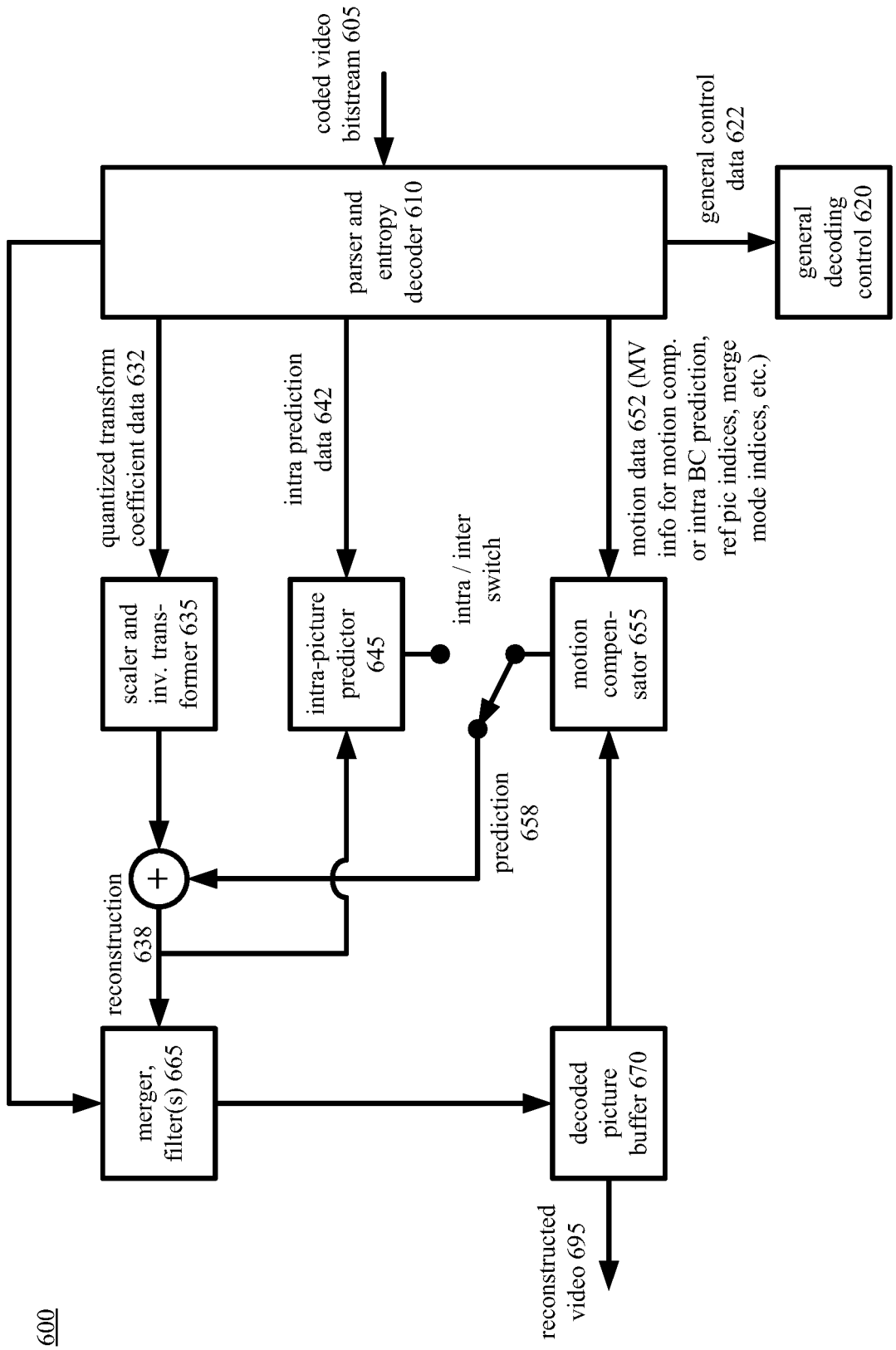
FIG. 6 is a diagram illustrating an example video decoder in conjunction with which some described embodiments can be implemented.

FIG. 6 is a block diagram of a generalized decoder (600) in conjunction with which some described embodiments can be implemented. The decoder (600) receives encoded data in a coded video bitstream (605) and produces output including pictures for reconstructed video (695). The format of the coded video bitstream (605) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (600) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the HEVC standard, a picture is partitioned into CTUs (CTBs), CUs (CBs), PUs (PBs) and TU (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662). In particular, for the motion data (652), the parser/entropy decoder (610) can entropy decode syntax elements for differential MV values, e.g., using context-adaptive binary arithmetic decoding, then combine the differential MV values with predicted MV values to reconstruct MV values that may be used for inter-picture prediction or intra BC prediction.

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding.

If the current picture is predicted using inter-picture prediction or intra BC prediction, a motion compensator (655) receives the motion data (652), such as MV data, reference picture selection data and merge mode index values. The motion compensator (655) also receives an indication of the selected MV precision. For inter-picture prediction, the motion compensator (655) applies MVs having the selected MV precision to the reconstructed reference picture(s) from the decoded picture buffer (670). Or, for intra BC prediction, the motion compensator (655) applies MVs having the selected MV precision to reconstructed parts of the current picture, as a reference picture, to predict sample values of blocks of the current picture. The motion compensator (655) produces motion-compensated predictions for inter-coded blocks of the current picture and/or intra-BC-predicted values for intra-BC-predicted blocks of the current picture. The decoded picture buffer (670) stores one or more previously reconstructed pictures for use as reference pictures.

In a separate path within the decoder (600), the intra-frame prediction predictor (645) receives the intra prediction data (642), such as prediction mode direction (for intra spatial prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture.

The intra/inter switch selects values of a motion-compensated prediction or intra-picture prediction for use as the prediction (658) for a given block. For example, when HEVC syntax is followed, the intra/inter switch can be controlled based on a syntax element encoded for a CU of a picture that can contain intra-predicted CUs and inter-predicted CUs. The decoder (600) combines the prediction (658) with reconstructed residual values to produce the reconstruction (638) of the content from the video signal.

To reconstruct the residual, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof).

For spatial intra-picture prediction, the values of the reconstruction (638) can be fed back to the intra-picture predictor (645). Also, the values of the reconstruction (638) can be used for motion-compensated prediction of subsequent pictures, or for intra BC prediction using the current picture as a reference picture. For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing filter. The post-processing filter can include de-ringing filtering, adaptive Wiener filtering, film-grain reproduction filtering, SAO filtering or another kind of filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Unified Intra Block Copy and Inter Prediction Modes.

Both intra block copy ("BC") prediction and inter-picture prediction use sample values of previously reconstructed blocks to predict the sample values of a current block of a current picture. Inter-picture prediction uses sample values of previously reconstructed blocks in another picture. Intra BC prediction, on the other hand, uses sample values of previously reconstructed blocks in the current picture.

This section presents various innovations in unified intra BC and inter prediction modes. In some example implementations, bitstream syntax, semantics of syntax elements and many coding/decoding processes for inter prediction mode are reused or slightly modified to enable intra BC prediction for blocks of a picture. With this unification of syntax, semantics and coding/decoding processes, various coding/decoding tools designed for inter prediction mode can also be applied when intra BC prediction is used, which simplifies implementation of intra BC prediction.

A. ENCODING WITH UNIFIED INTRA BC AND INTER PREDICTION MODES

FIG. 7 shows a generalized technique (700) for encoding with unified intra BC and inter prediction modes. A video encoder such as one described above with reference to FIG. 3 or FIG. 5, or another video encoder, can perform the technique (700).

To start, the video encoder encodes (710) a current picture to produce encoded data. As part of the encoding (710), the encoder performs intra BC prediction for a current block of the current picture, where the intra BC prediction uses inter prediction mode with the current picture as a reference picture. The current block can be a prediction block ("PB") or other block. For example, to provide intra BC prediction for the current block, the encoder performs motion compensation, applying an MV that indicates a displacement within the current picture, with the current picture being used as the reference picture for the motion compensation. To encode (710) the current picture, the encoder can perform the technique (800) shown in FIG. 8 or encode the current picture in some other way.

The encoder outputs (720) the encoded data in a bitstream. The format of the bitstream is a variation or extension of HEVC format (H.265). Alternatively, the format of the bitstream is a variation or extension of Windows Media Video format, VC-1 format, MPEG-x format (e.g., MPEG-1, MPEG-2, or MPEG-4), H.26x format (e.g., H.261, H.262, H.263, H.264), or another format.

The encoder can repeat the technique (700) on a picture-by-picture basis. For the sake of simplicity, FIG. 7 does not show other types of prediction that can be used when encoding the current picture.

Figure 8:
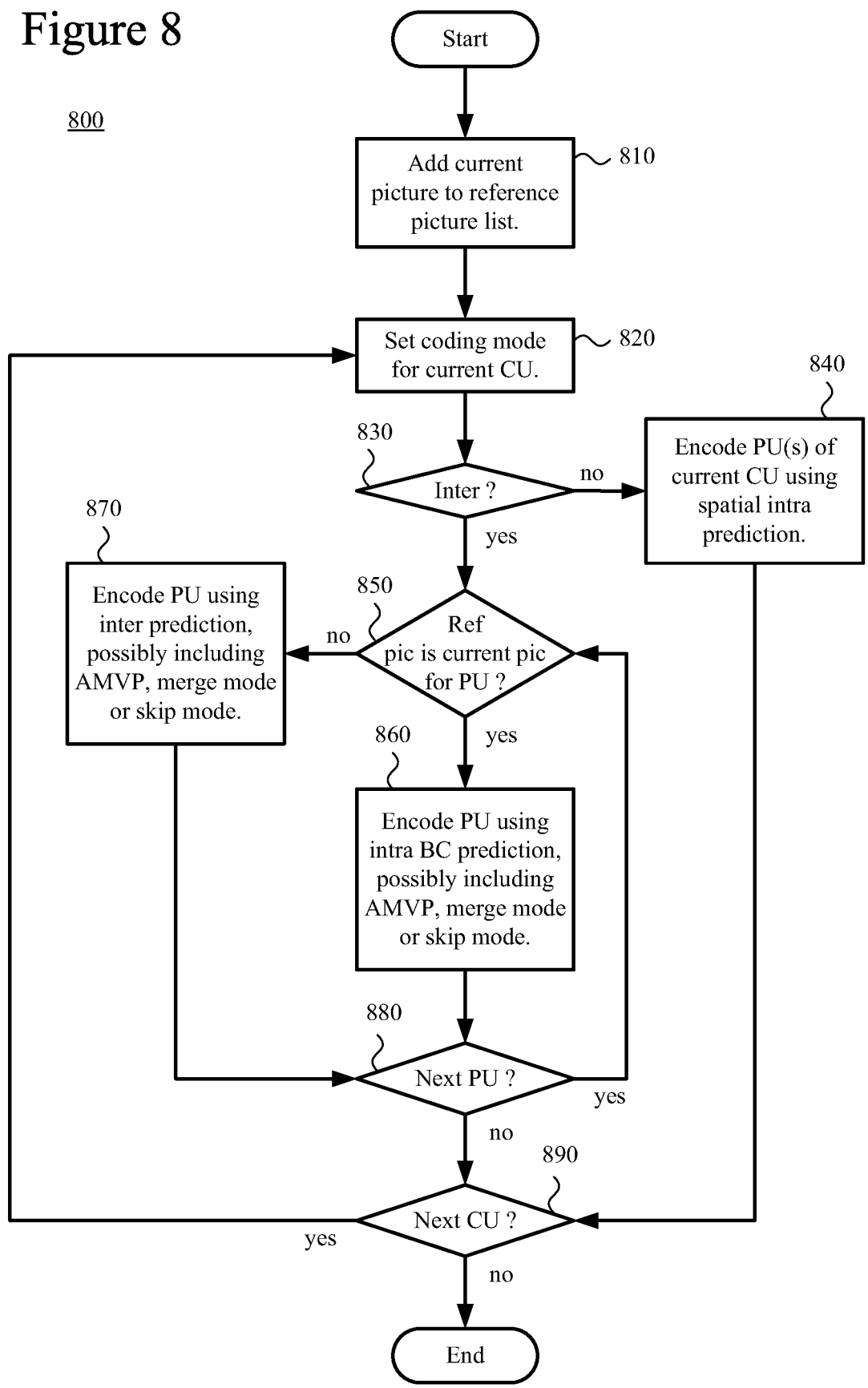
FIG. 8 is a flowchart illustrating an example technique for encoding that includes unified intra BC and inter prediction modes.

FIG. 8 shows an example technique (800) for encoding that includes unified intra BC and inter prediction modes. A video encoder such as one described above with reference to FIG. 3 or FIG. 5, or another video encoder, can perform the technique (800).

To start, the encoder adds (810) the current picture to a reference picture list ("RPL"). For example, the encoder adds the current picture to an RPL using one of the approaches described below in the section entitled, "Reference Picture Management." Alternatively, the encoder adds the current picture to an RPL using another approach.

Then, on a CU-by-CU basis, the encoder encodes the coding units ("CUs") of the current slice. Different CUs can have different coding modes (prediction modes). The encoder sets (820) the coding mode for the current CU. For example, the encoder selects spatial intra prediction mode or inter prediction mode as the coding mode for the current CU. Alternatively, the encoder selects from among other and/or additional coding modes.

The encoder checks (830) the coding mode for the current CU. If the coding mode is not inter prediction mode, the encoder encodes (840) the prediction unit(s) ("PU(s)") of the current CU (specifically, PBs of the PU(s)) using spatial intra prediction. For spatial intra prediction, the current CU can include a single PU. Or, if the PU size is smaller than the CU size, the current CU can include multiple PUs.

If the coding mode for the current CU is inter prediction mode, the encoder checks (850) whether the current picture is the reference picture for a given PU of the current CU. In this example, different PUs can use different reference pictures for prediction. If the current picture is the reference picture for a given PU, the encoder encodes (860) the PU (specifically, PBs of the PU) using intra BC prediction. Otherwise (current picture is not the reference picture for the PU), the encoder encodes (870) the PU (specifically, PBs of the PU) using inter-picture prediction. As part of the encoding (860, 870) in inter prediction mode, the encoder can use advanced MV prediction for the PU, merge mode for the PU, or skip mode for the CU. The encoder can implement the inter-picture prediction and intra BC prediction using the same motion compensation process. In some cases (e.g., current slice is an I slice), the current picture may be the only reference picture available for the current slice, such that intra BC prediction is always used if the coding mode of the current CU is inter prediction mode, and the encoder need not check (850) the reference picture for PU(s) of the current CU.

After encoding a PU of the current CU in inter prediction mode, the encoder checks (880) whether to continue with the next PU of the current CU. For inter prediction mode, the current CU can include a single PU or, if the PU size is smaller than the CU size, multiple PUs. If there is another PU in the current CU, the encoder continues by encoding the next PU in the current CU in inter prediction mode.

Otherwise (no more PUs to encode in the current CU), the encoder checks (890) whether to continue with the next CU in the current slice. In this way, the encoder encodes the CUs of the current slice on a CU-by-CU basis.

The encoder can repeat the technique (800) on a slice-by-slice basis for the slices of the current picture. Alternatively, the encoder can repeat the technique on a picture-by-picture basis.

Depending on implementation, as part of the unification of intra BC prediction and inter prediction modes, the encoder can be adapted in any one or more of the following ways.

Mode Signaling. Intra BC prediction can be implemented as a case of inter prediction mode, without explicit signaling of an intra BC prediction mode for the current block or a block that contains the current block. Instead, the encoder signals the mode that applies for the current block to be inter prediction mode, but the MV value for the current block represents a displacement within the current picture, which is used as a reference picture. Treatment of the current block depends on which reference picture is used. If the reference picture index for the current block selects the current picture, intra BC prediction is used in inter prediction mode; otherwise, inter-picture prediction is used.

The encoder can selectively enable or disable intra BC prediction mode, then set a value of a flag in the bitstream to indicate whether the intra BC prediction mode is enabled or disabled. For example, the encoder determines whether to enable or disable intra BC prediction mode for a sequence, and the flag is part of a SPS. Alternatively, the encoder can determine whether to enable or disable BC prediction mode on a picture-by-picture basis, slice-by-slice basis, or some other basis, and signal the flag as part of a picture parameter set ("PPS"), slice header, or some other syntax structure, or as part of a video usability information ("VUI") message. If intra BC prediction mode is enabled, the current picture can be a reference picture. Otherwise (intra BC prediction not enabled), the current picture cannot be a reference picture.

Alternatively, as part of the encoding, the encoder can set a coding mode that applies for the current block, choosing from among multiple available coding modes that include an intra BC prediction mode. For example, the coding modes include intra prediction mode, inter prediction mode and intra BC prediction mode. The encoder can set the coding mode for a current CU or some other block. The bitstream includes a syntax element that indicates the coding mode that applies for the current block. If the coding mode that applies for the current block is the intra BC prediction mode, syntax elements generally follow syntax for the inter prediction mode. Inter prediction direction and reference picture index need not be signaled when intra BC coding mode is explicitly signaled, however. The values of these syntax elements can be inferred—if the coding mode that applies for the current block is intra BC prediction mode, prediction direction is not needed, and the reference picture is known to be the current picture.

Reference Picture Management. As part of the encoding, the encoder can add the current picture to a reference picture list ("RPL"). An RPL is a list of reference pictures used for inter-picture prediction or, with the current picture added to the list, intra BC prediction. In HEVC, when encoding a current slice that includes a current block, either one or two RPLs are available—list 0 and list 1. The way a current picture is added to an RPL can depend on implementation.

In some approaches, the encoder adds the current picture at a last position of an RPL. Considering how reference picture index values are entropy coded, adding the current picture at the last position of the RPL presumes the current picture will be the least commonly used reference picture for a P slice or B slice. The encoder increments a counter that indicates a number of reference pictures active (e.g., for a current slice that includes the current block). For example, if the current slice is a P slice or a B slice, the encoder adds the current picture to an RPL after invocation of an RPL construction process in which one or more other reference pictures are added to the RPL. If the current slice is an I slice, when intra BC prediction mode is enabled, the encoder adds the current picture to the RPL at the start of encoding of the current slice, and the counter indicates a single reference picture is active for the current I slice.

Alternatively, the timing of adding the current picture to an RPL is different. For example, if the current slice is a P slice or a B slice, the encoder adds the current picture to an RPL during an RPL construction process in which one or more other reference pictures are added to the RPL. If the current slice is an I slice, when intra BC prediction mode is enabled, the encoder adds the current picture to the RPL at the start of encoding of the current slice, and the counter indicates a single reference picture is active for the current I slice.

A value of a syntax element in the bitstream can indicate the number of reference pictures active (e.g., for a current slice). In example HEVC implementations, the syntax element is num_ref_idx_l0_active_minus1 or num_ref_idx_l1_active_minus1.

A reference picture can be a long-term reference picture ("LTRP") or short-term reference picture ("STRP"), which affects reference picture management and some operations such as MV prediction and MV scaling. When the current picture is used as a reference picture to support intra BC prediction, the encoder can initially mark the current picture as an LTRP, then mark the current picture as an STRP after the encoding of the current picture finishes. This enables intra BC prediction using the current picture as a reference picture in inter prediction mode, while limiting how the current picture affects other processes such as MV prediction and MV scaling. Alternatively, the current picture can be marked in some other way to limit its effects on MV prediction and MV scaling operations.

MV Signaling and MV Prediction. Depending on implementation, the encoder can use any of several different approaches to MV signaling and MV prediction for the MV that is applied when performing intra BC prediction for the current block.

For example, when intra BC prediction is used for the current block, the encoder identifies an MV of the current block, where the MV indicates an integer-pixel offset. The encoder signals the MV in the bitstream at integer-pixel precision. The encoder can adjust the MV (e.g., scaling by a factor of four, left shifting by two) before applying it in a motion compensation process that works with fractional-pixel MV values (e.g., MVs with ¼-pixel precision). Alternatively, when intra BC prediction is used for the current block, the encoder identifies an MV of the current block, and the MV indicates an integer-pixel offset, but the encoder signals the MV in the bitstream at a fractional-pixel precision (e.g., ¼-pixel precision).

Even when luma MVs have integer-pixel precision, corresponding chroma MVs can have a fractional-pixel precision after scaling (e.g., for YUV 4:2:0 video or YUV 4:2:2 video). After the encoder derives a chroma MV from a luma MV that indicates an integer-pixel offset, the encoder can round or truncate the chroma MV to indicate an integer-pixel offset.

When signaling the MV for a current block predicted using intra BC prediction, the encoder can use merge mode, skip mode, advanced MV prediction mode and/or another coding tool that is available for MV signaling or MV prediction in inter prediction mode. In general, for merge mode, the encoder derives one or more merge mode candidates from spatially or temporally adjacent blocks (where a merge mode candidate has an inter prediction direction, a reference picture index and an MV value), selects one of the merge mode candidates, and signals a merge mode index that indicates the selected merge mode candidate. Skip mode can be implemented as a special case of merge mode in which no residual information is signaled for a current block. For advanced MV prediction mode, in general, the encoder derives an MV predictor from spatially or temporally adjacent blocks, determines an MV difference and encodes the MV difference and an MV predictor index. By reusing coding tools that are available for MV signaling or MV prediction in inter prediction mode, implementation of intra BC prediction is simplified.

In some cases, when the encoder uses merge mode for an intra-BC-predicted block, the encoder can screen merge mode candidates to remove candidates that do not reference the current picture. For example, for each of one or more merge mode candidate, the encoder obtains the merge mode candidate and checks whether it references the current picture. If the merge mode candidate references the current picture, the encoder retains the merge mode candidate. Otherwise, the encoder excludes the merge mode candidate. In this way, the encoder effectively limits the merge mode candidates to MVs previously used for intra BC prediction. Later, if the number of retained merge mode candidates is less than the number of allowed merge mode candidates, the encoder can add one or more pre-defined merge mode candidates, which are expected to provide reasonable options for MV prediction when intra BC prediction is used. For example, pre-defined merge mode candidates using the current picture as reference picture and having an MV in the list $\{(-W, 0), (0, -H), (-W, -H), (-2W, 0), (0, -2H)\}$, where W and H are the width and height of the current block, can be added until the number of allowed merge mode candidates is reached.

Also, when the encoder uses merge mode or advanced MV prediction mode for an intra-BC-predicted block in an I slice, the encoder can disable temporal MV prediction. This can streamline encoding by simplifying MV prediction and avoiding MV scaling, and by avoiding using information in another picture/slice when encoding the current I slice.

Syntax. For unified intra BC and inter prediction modes, the syntax of inter prediction mode can be followed for intra BC prediction, which simplifies implementation. For example, depending on implementation, the syntax elements for an intra-BC-predicted block can include syntax elements for an MV value, merge mode index, reference picture index, etc. An intra-BC-predicted block can be part of an I slice, P slice or B slice.

When the current block is part of an I slice, the encoder can set values of syntax elements in different ways depending on whether intra BC prediction mode is enabled. If intra BC prediction mode is enabled, the syntax elements for the current I slice follow syntax for a P slice or B slice (depending on which RPL includes the current picture—P slice if list 0, B slice otherwise). If the intra BC prediction mode is not enabled, the syntax elements for the current I slice follow default syntax for an I slice (that is, syntax for blocks predicted using spatial intra prediction).

When intra BC prediction mode is enabled, the encoder sets values of syntax elements of the bitstream such that none of the syntax elements leads to referencing of a non-reconstructed part of the current picture during the encoding the current picture. That is, even when inter prediction mode syntax, semantics, processing, etc. are used to implement intra BC prediction functionality, the encoder sets the values of syntax elements such that intra BC prediction references only previously reconstructed parts of the current picture.

Prediction Operations. For unified intra BC and inter prediction modes, many encoding processes in inter prediction mode can be used for intra BC prediction, which simplifies implementation. In a few respects, however, encoding processes of inter prediction mode may be modified for intra BC prediction.

Depending on implementation, the encoder can use 4×4 block size for intra BC prediction even if 4×4 block size is not otherwise used for inter prediction mode. For example, as part of inter prediction mode processing for the current block, the encoder can use 4×4 block size if the reference picture is the current picture and the prediction direction is uni-predictive (from the RPL that includes the current picture). When block size for inter prediction mode is signaled before a reference picture indicator (e.g., when block size (partition mode) is signaled for a CU, but prediction directions and reference picture indices are signaled for PUs of the CU), the encoder can decide block size considering, among other factors, reference pictures and prediction directions used for blocks. If the block size that applies for a current block is 4×4, the encoder can skip signaling of syntax elements for prediction direction and reference picture index for the current block, since the prediction direction can only be uni-predictive (from the RPL that includes the current picture) and the reference picture can only be the current picture. In this situation, syntax elements for prediction direction and reference picture index for the current block can be omitted from the bitstream. Alternatively, in this situation, 4×4 block size for intra BC prediction is disabled. Or, use of 4×4 block size for intra BC prediction can be enabled or disabled for a sequence or within a sequence, as indicated by a syntax element in the bitstream.

As another example, depending on implementation, the encoder can enable a compound intra-inter prediction mode. For example, when the current block is part of a B slice, the encoder can combine, as prediction results from two different reference pictures, the results of intra BC prediction for the current block and results of motion-compensated prediction for the current block. This allows the encoder to blend results of intra BC prediction and results of motion-compensated prediction for the current block. Alternatively, combining of results of intra BC prediction and results of motion-compensated prediction is not allowed.

Other Encoder Decisions. When an intra-BC-predicted block is part of a B slice, the encoder can modify the process of setting the value of a syntax element that indicates whether only zero-value MV differentials are allowed when a second RPL is used in bidirectional inter prediction for blocks of the B slice. For intra BC prediction, the current picture is added to a first RPL or second RPL. The encoder can evaluate whether, aside from the current picture, (a) the number of reference pictures in the first RPL matches the number of reference pictures in the second RPL, and (b) each of the reference pictures in the first RPL is also represented at a corresponding position in the second RPL. If both conditions are satisfied, the encoder can set the value of the syntax element to indicate only zero-value MV differentials are allowed when the second RPL is used in bidirectional inter prediction for blocks of the B slice. In example HEVC implementations, the syntax element is the mvd_l1_zero_flag syntax element.

B. DECODING WITH UNIFIED INTRA BC AND INTER PREDICTION MODES

FIG. 9 shows a generalized technique (900) for decoding with unified intra BC and inter prediction modes. A video decoder such as one described above with reference to FIG. 4 or FIG. 6, or another video decoder, can perform the technique (900).

To start, the video decoder receives (910) encoded data in a bitstream. The format of the bitstream is a variation or extension of HEVC format (H.265). Alternatively, the format of the bitstream is a variation or extension of Windows Media Video format, VC-1 format, MPEG-x format (e.g., MPEG-1, MPEG-2, or MPEG-4), H.26x format (e.g., H.261, H.262, H.263, H.264), or another format.

The video decoder decodes (920) a current picture using the encoded data. As part of the decoding (920), the video decoder performs intra BC prediction for a current block of the current picture, where the intra BC prediction uses inter prediction mode with the current picture as a reference picture. The current block can be a PB or other block. For example, to provide intra BC prediction for the current block, the decoder performs motion compensation, applying an MV that indicates a displacement within the current picture, with the current picture being used as the reference picture for the motion compensation. To decode (920) the current picture, the decoder can perform the technique (1000) shown in FIG. 10 or decode the current picture in some other way.

The decoder can repeat the technique (900) on a picture-by-picture basis. For the sake of simplicity, FIG. 9 does not show other types of prediction that can be used when decoding the current picture.

Figure 10:
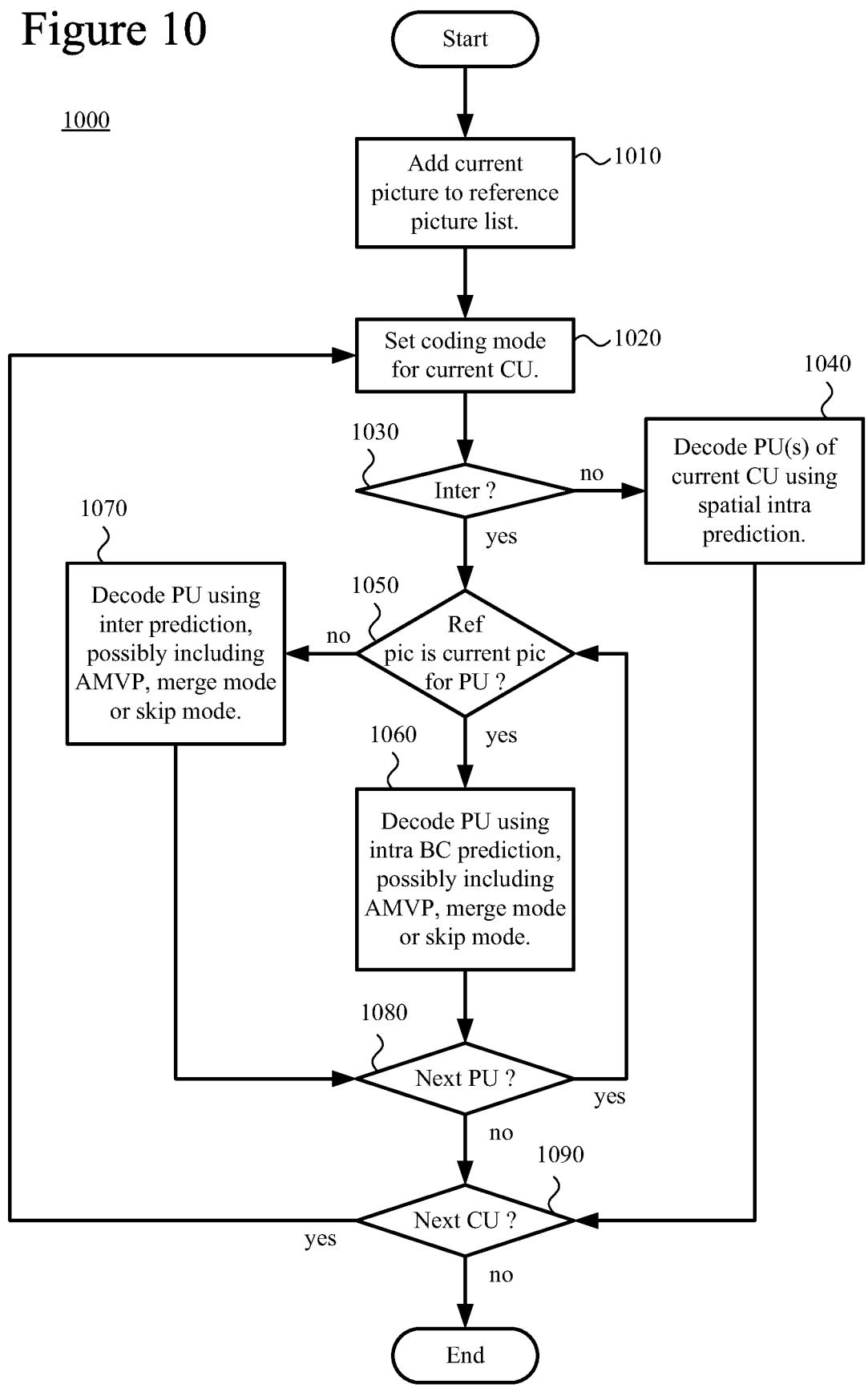
FIG. 10 is a flowchart illustrating an example technique for decoding that includes unified intra BC and inter prediction modes.

FIG. 10 shows an example technique (1000) for decoding that includes unified intra BC and inter prediction modes. A video decoder such as one described above with reference to FIG. 4 or FIG. 6, or another video decoder, can perform the technique (1000).

To start, the decoder adds (1010) the current picture to an RPL. For example, the decoder adds the current picture to an RPL using one of the approaches described below in the section entitled, "Reference Picture Management." Alternatively, the decoder adds the current picture to an RPL using another approach.

Then, on a CU-by-CU basis, the decoder decodes the CUs of the current slice. Different CUs can have different coding modes (prediction modes). The decoder sets (1020) the coding mode for the current CU, e.g., based on a syntax element in the bitstream. For example, the decoder selects spatial intra prediction mode or inter prediction mode as the coding mode for the current CU. Alternatively, the decoder selects from among other and/or additional coding modes.

The decoder checks (1030) the coding mode for the current CU. If the coding mode is not inter prediction mode, the decoder decodes (1040) the PU(s) of the current CU (specifically, PBs of the PU(s)) using spatial intra prediction. For spatial intra prediction, the current CU can include a single PU. Or, if the PU size is smaller than the CU size, the current CU can include multiple PUs.

If the coding mode for the current CU is inter prediction mode, the decoder checks (1050) whether the current picture is the reference picture for a given PU of the current CU. In this example, different PUs can use different reference pictures for prediction. If the current picture is the reference picture for a given PU, the decoder decodes (1060) the PU (specifically, PBs of the PU) using intra BC prediction. Otherwise (current picture is not the reference picture for the PU), the decoder decodes (1070) the PU (specifically, PBs of the PU) using inter-picture prediction. As part of the decoding (1060, 1070) in inter prediction mode, the decoder can use advanced MV prediction for the PU, merge mode for the PU, or skip mode for the CU. The decoder can implement the inter-picture prediction and intra BC prediction using the same motion compensation process. In some cases (e.g., current slice is an I slice), the current picture may be the only reference picture available for the current slice, such that intra BC prediction is always used if the coding mode of the current CU is inter prediction mode, and the decoder need not check (1050) the reference picture for PU(s) of the current CU.

After decoding a PU of the current CU in inter prediction mode, the decoder checks (1080) whether to continue with the next PU of the current CU. For inter prediction mode, the current CU can include a single PU or, if the PU size is smaller than the CU size, multiple PUs. If there is another PU in the current CU, the decoder continues by decoding the next PU in the current CU in inter prediction mode.

Otherwise (no more PUs to decode in the current CU), the decoder checks (1090) whether to continue with the next CU in the current slice. In this way, the decoder decodes the CUs of the current slice on a CU-by-CU basis.

The decoder can repeat the technique (1000) on a slice-by-slice basis for the slices of the current picture. Alternatively, the decoder can repeat the technique on a picture-by-picture basis.

Depending on implementation, as part of the unification of intra BC prediction and inter prediction modes, the decoder can be adapted in any one or more of the following ways.

Mode Signaling. Intra BC prediction can be implemented as a case of inter prediction mode, without explicit signaling of an intra BC prediction mode for the current block or a block that contains the current block. Instead, the decoder determines the mode that applies for the current block to be inter prediction mode. The MV value for the current block represents a displacement within the current picture, however, which is used as a reference picture. Treatment of the current block depends on which reference picture is used. If the reference picture index for the current block selects the current picture, intra BC prediction is used in inter prediction mode; otherwise, inter-picture prediction is used.

The decoder can selectively enable or disable intra BC prediction mode based on a signal at a higher layer of bitstream syntax. For example, the decoder receives and parses a flag in the bitstream that indicates whether intra BC prediction mode is enabled or disabled. The flag can be part of a SPS, indicating whether intra BC prediction mode is enabled or disabled for a sequence. Alternatively, the decoder can selectively enable or disable BC prediction mode on a picture-by-picture basis, slice-by-slice basis, or some other basis, based on a flag signaled as part of a PPS, slice header, or some other syntax structure, or as part of a VUI message. If intra BC prediction mode is enabled, the current picture can be a reference picture. Otherwise (intra BC prediction not enabled), the current picture cannot be a reference picture.

Alternatively, as part of the decoding, the decoder can parse, from the bitstream, a syntax element that indicates a coding mode that applies for the current block (where one option for the coding mode is intra BC prediction mode), then set the coding mode. For example, the decoder chooses among multiple available coding modes that include intra prediction mode, inter prediction mode and intra BC prediction mode. The decoder can set the coding mode for a current CU or some other block. If the coding mode that applies for the current block is the intra BC prediction mode, syntax elements generally follow syntax for the inter prediction mode. Inter prediction direction and reference picture index need not be signaled when intra BC coding mode is explicitly signaled, however, since the values of these syntax elements can be inferred.

Reference Picture Management. As part of the decoding, the decoder can add the current picture to an RPL. The way a current picture is added to an RPL can depend on implementation.

In some approaches, the decoder adds the current picture at a last position of an RPL. The decoder increments a counter that indicates a number of reference pictures active (e.g., for a current slice that includes the current block). For example, if the current slice is a P slice or a B slice, the decoder adds the current picture to an RPL after invocation of an RPL construction process in which one or more other reference pictures are added to the RPL. If the current slice is an I slice, when intra BC prediction mode is enabled, the decoder adds the current picture to the RPL at the start of decoding of the current slice, and the counter indicates a single reference picture is active for the current I slice.

Alternatively, the timing of adding the current picture to an RPL is different. For example, if the current slice is a P slice or a B slice, the decoder adds the current picture to an RPL during an RPL construction process in which one or more other reference pictures are added to the RPL. If the current slice is an I slice, when intra BC prediction mode is enabled, the decoder adds the current picture to the RPL at the start of decoding of the current slice, and the counter indicates a single reference picture is active for the current I slice.

A value of a syntax element in the bitstream can indicate the number of reference pictures active (e.g., for a current slice). In example HEVC implementations, the syntax element is num_ref_idx_l0_active_minus1 or num_ref_idxl1_active_minus1.

A reference picture can be an LTRP or STRP. When the current picture is used as a reference picture to support intra BC prediction, the decoder can initially mark the current picture as an LTRP, then mark the current picture as an STRP after the decoding of the current picture finishes. This enables intra BC prediction using the current picture as a reference picture in inter prediction mode, while limiting how the current picture affects other processes such as MV prediction and MV scaling. Alternatively, the current picture can be marked in some other way to limit its effects on MV prediction and MV scaling operations.

MV Prediction and MV Reconstruction. Depending on implementation, the decoder can use any of several different approaches to MV prediction and MV reconstruction for the MV that is applied when performing intra BC prediction for the current block.

For example, when intra BC prediction is used for the current block, the decoder reconstructs an MV of the current block, where the MV indicates an integer-pixel offset and is signaled in the bitstream at integer-pixel precision. The decoder adjusts the MV (e.g., scaling by a factor of four, left shifting by two) before applying it in a motion compensation process that works with fractional-pixel MV values (e.g., MVs with ¼-pixel precision). Alternatively, when intra BC prediction is used for the current block, the decoder reconstructs an MV of the current block, where the MV indicates an integer-pixel offset, but the MV is signaled in the bitstream at a fractional-pixel precision (e.g., ¼-pixel precision).

Even when luma MVs have integer-pixel precision, corresponding chroma MVs can have a fractional-pixel precision after scaling (e.g., for YUV 4:2:0 video or YUV 4:2:2 video). After the decoder derives a chroma MV from a luma MV that indicates an integer-pixel offset, the decoder can round or truncate the chroma MV to indicate an integer-pixel offset.

When reconstructing the MV for a current block predicted using intra BC prediction, the decoder can use merge mode, skip mode, advanced MV prediction mode and/or another coding/decoding tool that is available for MV reconstruction in inter prediction mode. In general, for merge mode, the decoder derives one or more merge mode candidates from spatially or temporally adjacent blocks, then selects one of the merge mode candidates based on a merge mode index signaled in the bitstream. For advanced MV prediction mode, in general, the decoder derives an MV predictor from spatially or temporally adjacent blocks and from an MV predictor index, decodes an MV difference and combines the MV difference with the MV predictor. By reusing coding/decoding tools that are available for MV reconstruction in inter prediction mode, implementation of intra BC prediction is simplified.

When the decoder uses merge mode for an intra-BC-predicted block, the decoder can screen merge mode candidates to remove candidates that do not reference the current picture. For example, for each of one or more merge mode candidate, the decoder obtains the merge mode candidate and checks whether it references the current picture. If the merge mode candidate references the current picture, the decoder retains the merge mode candidate. Otherwise, the decoder excludes the merge mode candidate. Later, if the number of retained merge mode candidates is less than the number of allowed merge mode candidates, the decoder can add one or more pre-defined merge mode candidates, which are expected to provide reasonable options for MV prediction when intra BC prediction is used. For example, pre-defined merge mode candidates using the current picture as reference picture and having an MV in the list {(−W, 0), (0, −H), (−W, −H), (−2 W, 0), (0, −2H)} can be added until the number of allowed merge mode candidates is reached.

Also, when the decoder uses merge mode or advanced MV prediction mode for an intra-BC-predicted block in an I slice, the decoder can disable temporal MV prediction. This can streamline decoding by simplifying MV prediction and avoiding MV scaling, and by avoiding using information in another picture/slice when decoding the current I slice.

Syntax. For unified intra BC and inter prediction modes, the syntax of inter prediction mode can be followed for intra BC prediction, which simplifies implementation. For example, depending on implementation, the syntax elements for an intra-BC-predicted block can include syntax elements for an MV value, merge mode index, reference picture index, etc. An intra-BC-predicted block can be part of an I slice, P slice or B slice.

When the current block is part of an I slice, the decoder can parse syntax elements in different ways depending on whether intra BC prediction mode is enabled. If intra BC prediction mode is enabled, the syntax elements for the current I slice follow syntax for a P slice or B slice (depending on which RPL includes the current picture—P slice if list 0, B slice otherwise), and the current I slice is decoded as a P slice or B slice. If the intra BC prediction mode is not enabled, the syntax elements for the current I slice follow default syntax for an I slice (that is, syntax for blocks predicted using spatial intra prediction).

When intra BC prediction mode is enabled, the bitstream is constrained to include no syntax elements that lead to referencing of a non-reconstructed part of the current picture during the decoding the current picture. That is, even when inter prediction mode syntax, semantics, processing, etc. are used to implement intra BC prediction functionality, the values of syntax elements are set such that intra BC prediction references only previously reconstructed parts of the current picture.

Prediction Operations. For unified intra BC and inter prediction modes, many decoding processes in inter prediction mode can be used for intra BC prediction, which simplifies implementation. In a few respects, however, decoding processes of inter prediction mode may be modified for intra BC prediction.

Depending on implementation, the decoder can use 4×4 block size for intra BC prediction even if 4×4 block size is not otherwise used for inter prediction mode. For example, as part of inter prediction mode processing for the current block, if (a) the reference picture is the current picture and (b) the prediction direction is uni-predictive (from the RPL that includes the current picture), the decoder can use 4×4 block size for intra BC prediction. When block size for inter prediction mode is signaled before a reference picture indicator (e.g., when block size (partition mode) is signaled for a CU, but prediction directions and reference picture indices are signaled for PUs of the CU), the decoder parses a syntax element for the block size without knowing prediction direction or reference picture index for a current block, and hence without knowing whether the block uses intra BC prediction or inter-picture prediction. If the block size is 4×4, the decoder can skip parsing of syntax element for the prediction direction and reference picture index for the current block. When the block size that applies for a current block is 4×4, the prediction direction for the current block can only be uni-predictive (from the RPL that includes the current picture), and the reference picture for the current block can only be the current picture, so syntax elements for prediction direction and reference picture index for the current block are omitted from the bitstream. Alternatively, in this situation, 4×4 block size for intra BC prediction is disabled. Or, use of 4×4 block size for intra BC prediction can be enabled or disabled for a sequence or within a sequence, as indicated by a syntax element in the bitstream.

As another example, depending on implementation, the decoder can enable a compound intra-inter prediction mode. For example, when the current block is part of a B slice, the decoder can combine, as prediction results from two different reference pictures, the results of intra BC prediction for the current block and results of motion-compensated prediction for the current block. This allows the decoder to blend results of intra BC prediction and results of motion-compensated prediction for the current block. Alternatively, combining of results of intra BC prediction and results of motion-compensated prediction is not allowed.

C. EXAMPLE IMPLEMENTATIONS

In some example implementations, as part of the unification of intra BC prediction and inter prediction modes, an encoder and/or decoder can be adapted in any one or more of the following ways. In this section, some adaptations are illustrated as differences or modification relative to the HEVC standard. Other adaptations are illustrated as differences or modification relative to JCTVC-P1005_v1, which is a draft extension to the HEVC standard.

1. Default Syntax, Semantics and Decoding for Intra BC Prediction.

In the example implementations, when intra BC prediction is enabled, bitstream syntax for an I slice generally follows bitstream syntax for a P or B slice (depending on the RPL to which the current picture is added). For purposes of encoding and decoding, with some modifications or constraints on the processes, an I slice is treated like a P or B slice.

FIGS. 11a-11c show example syntax structures for unified intra BC and inter prediction modes. In general, syntax elements that may be signaled in the bitstream (depending on conditions) are shown in boldface.

FIG. 11a shows a portion of an example syntax structure (1101) for a slice segment header. Compared to the slice segment header syntax structure in JCTVC-P1005_v1, the syntax structure (1101) shown in FIG. 11a includes the additional lines:

```
}
if( slice_type = = P || slice_type = = B ||
intra_block_copy_enabled_flag ) {
    five_minus_max_num_merge_cand          ue(v)
}
``` which add a case in which the five_minus_max_num_merge_cand syntax element is signaled. This syntax element indicates the number of merge mode candidates allowed in merge mode processing for the current slice. With the change, the five_minus_max_num_merge_cand syntax element is signaled if the value of the intra_block_copy_enabled_flag is 1. (As before, the syntax element is also signaled if the current slice is a P slice or B slice.) The syntax element intra_block_copy_enabled_flag can be set as described in the next section, or set in some other way when intra BC prediction is enabled for a slice.

FIGS. 11b and 11c show an example syntax structure (1102) for a coding unit ("CU"). Compared to the CU syntax structure in JCTVC-P1005_v1, the syntax structure (1102) shown in FIGS. 11b-11c includes various modified lines. The two lines:

```
if( slice_type != I || intra_block_copy_enabled_flag)
    cu_skip_flag[ x0 ][ y0 ]                ae(v)
``` add a case in which the cu_skip_flag syntax element is signaled. The cu_skip_flag syntax element indicates whether the current CU is skipped (value 1) or not skipped (value 0). With the change, the cu_skip_flag syntax element is signaled if intra_block_copy_enabled_flag is 1. (As before, the syntax element is also signaled if the current slice is not an I slice.) The lines:

```
else {
    if( slice_type != I || intra_block_copy_enabled_flag)
        pred_mode_flag                      ae(v)
``` add a case in which the pred_mode_flag syntax element is signaled. The pred_mode_flag syntax element indicates whether the coding mode of the current CU is inter prediction mode (value 0), of which intra BC prediction is a case, or spatial intra prediction mode (value 1). With the change, the pred_mode_flag syntax is signaled if intra_block_copy_enabled_flag is 1. (As before, the syntax element is also signaled if the current slice is not an I slice.)

Elsewhere in the CU syntax structure (1102), an occurrence of the intra_bc_flag syntax element and various references to the intra_bc_flag syntax element are removed, such that intra BC prediction is no longer treated as a distinct coding mode or type of intra prediction. Instead, intra BC prediction mode is handled as a case of inter prediction mode. References to the intra_bc_flag syntax element (and associated treatment of intra BC prediction as a distinct coding mode/type) are also removed from syntax structures (not shown) for transform tree, transform unit and residual coding. Thus, when intra BC prediction is used for a CU, syntax structures for prediction unit, transform tree, transform unit and residual coding follow syntax for a CU coded in inter prediction mode.

Compared to JCTVC-P1005_v1, intra-picture decoding processes (and corresponding encoding processes) are modified in the example implementations to remove intra BC prediction as a distinct coding mode/type. Instead, intra BC prediction is handled as a case of inter prediction mode for which the reference picture is the current picture. Intra BC prediction is used when a signaled (or derived) reference picture index indicates that the current picture is the reference picture for motion compensation. In this case, the MV(s) signaled for PU(s) of a current CU represent block vector values. Various further modifications and constraints that may apply when intra BC prediction is used are described below.

2. Selectively Enabling/Disabling Intra BC Prediction Mode.

In the example implementations, intra BC prediction is enabled or disabled for a sequence by means of a flag in a SPS. To use intra BC prediction for a CU of a current picture, intra BC prediction is enabled for the sequence, and inter prediction mode is used for the CU, with the current picture as reference picture.

For example, in a SPS, if the value of syntax element intra_block_copy_enabled_flag is 1, the process of adding the current picture into an RPL (specifically, RPL 0) may be invoked. On the other hand, if the value of intra_block_copy_enabled_flag is 0, the process of adding the current picture into RPL 0 is not invoked. When not present, the value of intra_block_copy_enabled_flag is inferred to be 0.

Figure 12:
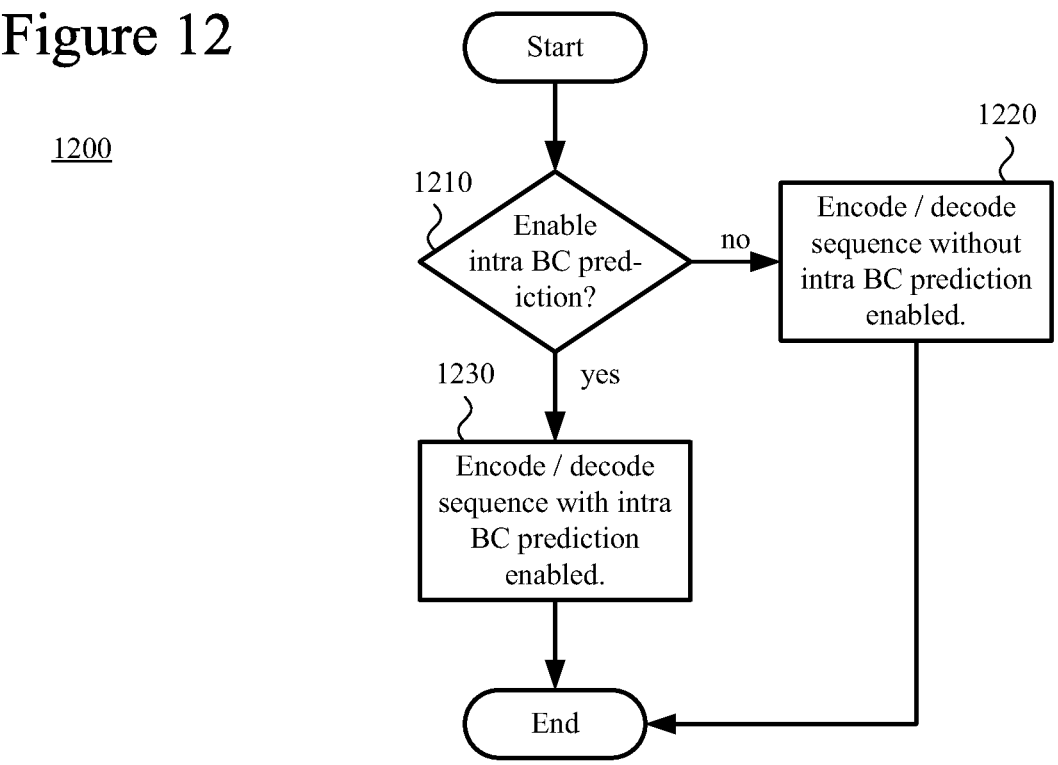
FIG. 12 is a flowchart illustrating a generalized technique for encoding or decoding that includes selectively enabling intra BC prediction for a sequence.

FIG. 12 shows a generalized technique (1200) for encoding or decoding that includes selectively enabling intra BC prediction for a sequence. A video encoder such as one described above with reference to FIG. 3 or FIG. 5, or another video encoder, can perform the technique (1200). Or, a video decoder such as one described above with reference to FIG. 4 or FIG. 6, or another video decoder, can perform the technique (1200).

To start, the encoder or decoder determines (1210) whether to enable intra BC prediction for a video sequence. For example, the encoder makes the determination (1210) based on a setting for an encoding session or application, then signals a syntax element in an SPS for the sequence to indicate whether intra BC prediction is enabled. Or, the decoder makes the determination (1210) based on a syntax element in a SPS for the sequence.

If intra BC prediction is enabled, the encoder/decoder encodes/decodes (1230) the sequence with intra BC prediction enabled. Otherwise, the encoder/decoder encodes/decodes (1220) the sequence without intra BC prediction enabled.

The encoder/decoder can repeat the technique (1200) on a sequence-by-sequence basis.

Alternatively, another high-level flag in a VUI message or other syntax structure can indicate whether intra BC prediction is enabled or disabled. The decision to enable or disable intra BC prediction can be made on a sequence-by-sequence basis, picture-by-picture basis, slice-by-slice basis or some other basis.

3. Updating RPL Counters.

In the example implementations, the values of up to two syntax elements in the bitstream indicate the number of reference pictures active in two RPLs for a current slice. The syntax element num_ref_idx_l0_active_minus1 indicates the number of reference pictures active in RPL 0 for the current slice (as the number minus 1), and the syntax element num_ref_idx_l1_active_minus1 indicates the number of reference pictures active in RPL 1 for the current slice (as the number minus 1). When intra BC prediction is used, if the current slice is a P or B slice, the value of num_ref_idx_l0_active_minus1 and/or the value of num_ref_idx_l1_active_minus1 is increased by 1 for the current slice, to account for the current picture as a reference picture. If the current slice is an I slice, num_ref_idx_l0_active_minus1 and/or num_ref_idx_l1_active_minus1 are set to zero for the current slice when intra BC prediction is used, to account for the addition of the current picture to RPL 0 and/or RPL 1.

For example, for a P or B slice, the syntax element num_ref_idx_l0_active_minus1 may be signaled as part of a slice segment header and specifies the maximum reference index for RPL 0 that may be used to decode the slice. The value of num_ref_idx_l0_active_minus1 is in the range of 0 to 14, inclusive. When num_ref_idx_l0_active_minus1 is not present in the slice segment header for a P or B slice, the value of num_ref_idx_l0_active_minus1 is inferred to be equal to num_ref_idx_l0_default_active_minus1. When the current slice is an I slice and intra BC prediction is not enabled, the value of num_ref_idx_l0_active_minus1 is inferred to be equal to −1 for I slice. When intra BC prediction is used, the value of num_ref_idx_l0_active_minus1 is increased by 1.

As another example, the syntax element num_ref_idx_l1_active_minus1 may be signaled as part of the slice segment header for a B slice and specifies the maximum reference index for RPL 1 that may be used to decode the slice. The value of num_ref_idx_l1_active_minus1 is in the range of 0 to 14, inclusive. When num_ref_idx_l1_active_minus1 is not present in the slice segment header for a B slice, the value of num_ref_idx_l1_active_minus1 is inferred to be equal to num_ref_idx_l1_default_active_minus1. When the current slice is an I slice and intra BC prediction is not enabled, the value of num_ref_idx_l1_default_active_minus1 is Inferred to be equal to −1 for the I slice. When intra BC prediction is used, the value of num_ref_idx_l1_active_minus1 is increased by 1.

4. Adding Current Picture to RPL after Other RPL Construction.

In the example implementations, when intra BC prediction is enabled, the current picture is added to an RPL after any other reference pictures have been added to the RPL in a default RPL construction process. Specifically, the current picture is added at the last position of RefPicList0 (RPL 0). After num_ref_idx_l0_active_minus1 is increased by 1:

RefPicList0[num_ref_idx_l0_active_minus1]=current decoded picture.

When the current slice is a P slice or B slice (and intra BC prediction is enabled), the process of adding the current picture to RPL 0 is invoked after completion of the RPL construction process in which one or more other reference pictures are added to RPL 0. When the current slice is an I slice (and intra BC prediction is enabled), the process of adding the current picture to RPL 0 is invoked at the beginning of the decoding process for the I slice. The value of num_ref_idx_l0_active_minus1 is increased by 1 for the current slice.

Figure 13:
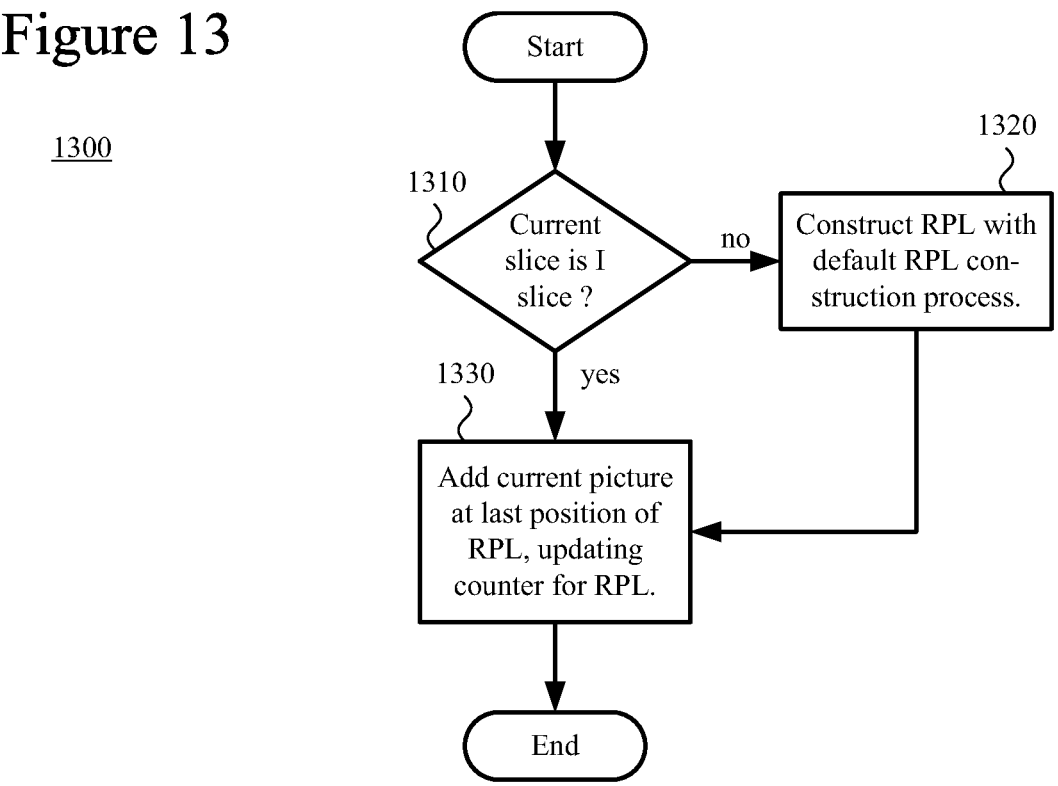
FIG. 13 is a flowchart illustrating an example technique for constructing an RPL that includes the current picture.

FIG. 13 shows an example technique (1300) for constructing a RPL that includes the current picture. A video encoder such as one described above with reference to FIG. 3 or FIG. 5, or another video encoder, can perform the technique (1300). Or, a video decoder such as one described above with reference to FIG. 4 or FIG. 6, or another video decoder, can perform the technique (1300).

To start, the encoder or decoder checks (1310) whether the current slice is an I slice. If not (e.g., the current slice is a P slice or B slice), the encoder/decoder constructs (1320) the RPL with a default RPL construction process, adding one or more other reference pictures (not the current picture) to the RPL.

Then, whether or not the current slice is an I slice, the encoder/decoder adds (1330) the current picture at the last position of the RPL. The encoder/decoder updates the counter that indicates the number of reference pictures active in the RPL for the current slice (e.g., as indicated with the num_ref_idx_l0_active_minus1 syntax element).

The encoder/decoder can repeat the technique (1300) on a slice-by-slice basis for the slices of the current picture. Alternatively, the encoder/decoder can repeat the technique on a picture-by-picture basis.

Alternatively, the current picture can be added at the last position of RefPicList1 (RPL 1), and the value of num_ref_idx_l1_active_minus1 is increased by 1 for the current slice. The current picture is added to RPL 1 after completion of the RPL construction process in which one or more other reference pictures are added to RPL 1 (for a P or B slice) or at the start of decoding the current slice (for an I slice).

As another alternative, the current picture can be added at the last position of RPL 0 (as described above) and added at the last position of RPL 1 (as described above), with the values of num_ref_idx_l0_active_minus1 and num_ref_idx_l1_active_minus1 each being increased by 1 for the current slice.

When the current picture is added to an RPL, the current picture can also be marked "used for long-term reference," as explained below. When decoding of the current picture finishes, the current picture can be marked "used for short-term reference," as explained below.

5. Adding Current Picture to RPL During RPL Construction.

As an alternative to adding the current picture to an RPL after any other reference pictures have been added to the RPL in a default RPL construction process, the current picture can be added to an RPL during an RPL construction process in which one or more other reference pictures are added to the RPL.

FIGS. 14a-14c show different approaches (1401, 1402, 1403) to adding a current picture during an RPL construction process. In each of these approaches, the value of num_ref_idx_l0_active_minus1 is increased by 1, the variable NumRpsCurrTempList0 is set to Max(num_ref_idx_l0_active_minus1+1, NumPocTotalCurr), and the list RefPicListTemp0 is constructed.

FIG. 14a shows one approach (1401) to adding a current picture during an RPL construction process. After a first set of reference pictures is added, the current picture is added to RefPicListTemp0 ("RefPicListTemp0[rIdx]=current picture and "rIdx++").

FIG. 14b shows a second approach (1402) to adding a current picture during an RPL construction process. Compared to the approach (1401) shown in FIG. 14a, the timing is different. The current picture is added to RefPicListTemp0 ("RefPicListTemp0[rIdx]=current picture and "rIdx++") after a second set of reference pictures is added to the list.

FIG. 14c shows a third approach (1403) to adding a current picture during an RPL construction process. After a third set of reference pictures is added, the current picture is added to RefPicListTemp0 ("RefPicListTemp0[rIdx]=current picture and "rIdx++").

Alternatively, the current picture can be added at some other position of RefPicListTemp0.

In addition to or instead of being added to RefPicListTemp0, the current picture can be added to RefPicListTemp1, which is a list for RPL 1, with a corresponding increase in the value of num_ref_idx_l0_active_minus1 by 1.

6. Marking of Current Picture as LTRP or STRP.

In the example implementations, when the current picture is added to an RPL because intra BC prediction is enabled, the current picture is marked as a long-term reference picture ("LTRP"). That is, when the current picture is added to an RPL for intra BC prediction, the current picture is marked "used for long-term reference." After decoding of the current picture finishes, the current picture is marked as a short-term reference picture ("STRP")—that is, "used for short-term reference."

7. Bitstream Constraints.

In the example implementations, the bitstream does not contain any syntax elements that would lead to the use of sample values of any non-reconstructed region in the current picture for intra BC prediction. Such constraints on the values of syntax elements in the bitstream can be expressed as follows.

Suppose a derivation process for z-scan order block availability accepts, as inputs, (1) the luma location (xCurr, yCurr) of the top-left sample of the current block relative to the top-left luma sample of the current picture, and (2) the luma location (xNbY, yNbY) covered by a neighboring block relative to the top-left luma sample of the current picture. This block availability process produces, as output, the availability of the neighboring block covering the location (xNbY, yNbY). Also suppose that the luma location (xCb, yCb) specifies the top-left sample of the current luma coding block ("CB") relative to the top-left luma sample of the current picture, and that the luma location (xB1, yB1) specifies the top-left sample of the current luma prediction block ("PB") relative to the top-left sample of the current luma CB.

If the reference picture in an RPL (e.g., RPL 0) is the current picture, for a conformant bitstream, the following conditions are true for any intra-BC-predicted block in the current picture.

First, when the block availability process is invoked with (xCb, yCb) and (xB1+mvL0[0], yB1+mvL0[1]) as inputs (1) and (2), respectively, the output of the block availability process shall be TRUE. That is, when the input (2) is the top-left corner of the block referenced by the MV for intra BC prediction, the output of the block availability process shall be TRUE.

Second, when the block availability process is invoked with (xCb, yCb) and (xB1+mvL0[0]+nPbW−1, yB1+mvL0[1]+nPbH−1) as inputs (1) and (2), respectively, the output of the block availability process shall be TRUE. The two variables nPbW and nPbH specify the width and height, respectively, of the luma PB. Thus, when the input (2) is the bottom-right corner of the block referenced by the MV for intra BC prediction, the output of the block availability process shall be TRUE.

In this analysis, MV values are modified when the reference picture in an RPL (e.g., RPL 0) is the current picture. In particular, mvL0<<=2 and mvCL0<<=2, where mvL0 is a luma MV signaled with integer-pixel precision and mvCL0 is a chroma MV derived with inter-pixel precision. Other conditions on bitstream conformance (which apply whether or not intra BC prediction is enabled, whether or not the current picture is a reference picture, etc.) also apply.

The variable initType (which specifies ctxIdx for which initialization is needed for each of three initialization types) is set as follows. If the current slice is an I slice and intra BC prediction is not enabled, initType is 0. Otherwise, if the current slice is an I slice and intra BC prediction is enabled, initType is 1. Otherwise, the value of initType is set as described in JCTVC-P1005_v1. Finally, compared to JCTVC-P1005_v1, constraints that reference the intra_bc_flag are removed.

8. Compound Prediction.

In the example implementations, compound prediction that combines sample values from intra BC prediction and sample values from another prediction (e.g., another intra BC prediction, motion compensation) is not allowed. That is, bi-directive prediction in which at least one of the reference pictures is the current picture is not allowed. This constraint can be enforced by checking values of syntax elements in the bitstream.

Alternatively, compound prediction that combines sample values from intra BC prediction and sample values from another prediction is allowed. That is, bi-directive prediction in which at least one of the reference pictures is the current picture is allowed.

9. 4×4 Intra BC Prediction.

In the example implementations, when the current picture is the reference picture for unidirectional prediction (single reference picture), the size of the PB can be 4×4 for intra BC prediction. Other block sizes (e.g., 64×64, 64×32, 32×64, 64×16, 64×48, 16×64, 48×64, 32×32, 32×16, 16×32, 32×8, 32×24, 8×32, 24×32, 16×16, 16×8, 8×16, 16×4, 16×12, 4×16, 12×16, 8×8, 8×4 and 4×8) are also possible.

Alternatively, intra BC prediction in which the size of the PB can be 4×4 is not supported.

10. MV Signaling and Reconstruction.

In the example implementations, an MV used as a block vector for intra BC prediction is signaled with integer-pixel precision. In contrast, an MV used for motion compensation relative to another picture is signaled with fractional-pixel precision. The precision of the MV for a current block of a current picture depends on the reference picture. If the reference picture is the current picture, the MV has integer-pixel precision. Otherwise (the reference picture is another picture), the MV has fractional-pixel precision. In practice, this can mean the interpretation of the signaled MV value varies depending on whether the current picture is the reference picture.

When an MV (for intra BC prediction) is signaled with integer-pixel precision, the MV is scaled before the MV is used in a motion compensation process that works with fractional-pixel MV values. For example, the horizontal and vertical components of the MV are scaled by a factor of 4 (with a left shift by 2, or with a multiplication) before the MV is input to a motion compensation process that accepts ¼-pixel MV values.

In the example implementations, when the current picture is the reference picture (for intra BC prediction), motion compensation does not include fractional pixel interpolation because MV values indicate integer-pixel offsets. Chroma MV components, which may indicate a fractional-pixel offset even if the corresponding luma MV component indicates an integer-pixel offset, can be rounded or truncated to indicate an integer-pixel offset. For example, for 4:2:0 video, when a luma MV is (1, 1), without rounding or truncation, the corresponding chroma MV would be (0.5, 0.5). To avoid this, the chroma MV can be modified as follows.

Suppose (xVec, yVec) is a luma MV in integer-pixel precision. Also suppose (xScale, yScale) is the scale of converting the luma MV to a chroma MV. Normally, the chroma MV is calculated as (xVec>>xScale, yVec>>yScale). For 4:2:0 video, (xScale, yScale) is (1, 1). For 4:2:2 video, (xScale, yScale) is (1, 0). For 4:4:4 video, (xScale, yScale) is (0, 0). To avoid generating a non-integer chroma MV, the (xVec, yVec) is modified as (xVec>>xScale<<xScale, yVec>>yScale<<yScale) before using as the chroma MV for motion compensation of chroma sample values.

Alternatively, for intra BC prediction, MVs are signaled with fractional-pixel precision such as ½-pixel precision or ¼-pixel precision. For example, MVs used in intra BC prediction still indicate integer-pixel offsets, but they are signaled with a fractional-pixel precision.

11. Coding/Decoding Tools for MV Prediction.

In the example implementations, various coding/decoding tools used for inter prediction mode can be used when intra BC prediction is used. For example, an encoder and decoder can use merge mode, skip mode and/or advanced MV prediction when the current picture is used as a reference picture for motion compensation (that is, for intra BC prediction).

12. Adjustments to Merge Mode Processing.

In the example implementations, an encoder and decoder can modify merge mode processing when a flag (or other value) distinguishes intra BC prediction from regular inter prediction mode. In this situation, when obtaining merge mode candidates (from spatial or temporal neighbors) for a block coded using intra BC prediction, the encoder/decoder can check whether a given merge mode candidate uses the current picture as a reference picture. If so, the encoder/decoder includes the merge mode candidate in the set of merge mode candidates. If not, the encoder/decoder can exclude the current merge mode candidate, marking it unavailable.

After screening merge mode candidates in this way, if the number of merge mode candidates is less than the number of merge candidate allowed (as indicated with the variable MaxNumMergeCand, and signaled with the five_minus_maxnum_merge_cand syntax element), the encoder/decoder can add merge mode candidates from a pre-defined list to the merge candidate set. For example, the pre-defined list is merge mode candidates using the current picture as reference picture and having an MV {(−W, 0), (0, −H), (−W, −H), (−2 W, 0), (0, −2H)}, where W is the width of current CU, and H is the height of current CU. Merge mode candidates from the list can be added, one after the other in the order given in the list, until the number of merge candidate allowed is reached.

13. Disabling Temporal MV Prediction.

In the example implementations, temporal MV prediction is disabled for an I slice when intra BC prediction is enabled. In this situation, even though the I slice may be treated like a P slice (or B slice) in many coding/decoding operations, and even though bitstream syntax for the I slice may follow bitstream syntax for a P slice (or B slice), disabling temporal MV prediction simplifies merge mode processing, advanced MV prediction and other operations, and avoids using information from another picture/slice during encoding or decoding of the current I slice.

For example, when a temporal MV predictor is derived during encoding or decoding, if slicetemporal_mvp_enabled_flag is equal to 0 or the current slice type is I, both components of the temporal MV predictor are set equal to 0, and the temporal MV predictor is marked as not being available.

14. Other Encoder Decisions.

The syntax element mvd_l1_zero_flag is part of a slice segment header for a B slice. When mvd_l1_zero_flag is 1, only zero-value MV differentials are allowed for RPL 1, if bidirectional prediction is used. In the example implementations, an encoder adapts its decision-making process for setting the value of mvd_l1_zero_flag syntax element when intra BC prediction is enabled.

For comparison, when intra BC prediction is not enabled, the encoder checks that (1) the number of reference pictures in RPL 0 equals the number of reference pictures in RPL 1, and (2) for every reference picture in RPL 0, the same reference picture (with the same POC) exists at the same position in RPL 1. If both conditions are satisfied, mvd_l1_zero_flag is set to 1. Otherwise, mvd_l1_zero_flag is set to 0.

When intra BC prediction is enabled (and the current picture is added to an RPL), the encoder checks slightly different conditions, which ignore the current picture. For example, if the current picture is added at the last position of RPL 0, the encoder checks that (1) the number of reference pictures in RPL 0 minus 1 (to account for the current picture) equals the number of reference pictures in RPL 1, and (2) for every reference picture in RPL 0 (except the last reference picture in RPL 0), the same reference picture (with the same POC) exists at the same position in RPL 1. If both conditions are satisfied, mvd_l1_zero_flag is set to 1. Otherwise, mvd_l1_zero_flag is set to 0.

15. Alternative Signaling of Intra BC Prediction Mode.

Alternatively, intra BC prediction can be selected as a distinct coding mode from among available coding modes that include intra BC prediction mode, intra prediction mode (spatial prediction) and inter prediction mode. For example, intra BC prediction can be selected as the coding mode for a CU, and the bitstream includes a syntax element that indicates the coding mode that applies for the current CU. If the coding mode that applies for the current CU is the intra BC prediction mode, syntax elements for the current CU (and its PUs, TUs, etc.) generally follow syntax for the inter prediction mode. Inter prediction direction and reference picture index are not explicitly signaled for the PUs, however, when intra BC coding mode is explicitly signaled for the current CU. Instead, the values of these syntax elements can be inferred. If the coding mode that applies for the current CU is intra BC prediction mode, signaling of prediction direction is not needed for any PU of the CU, and the reference picture is known to be the current picture. For example, if the current picture is only added into RPL 0, the inter prediction direction is inferred to be 0 (uni-directive prediction from RPL 0), and the reference picture index is inferred to be the one indicating the current picture as the reference picture.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system that implements a video decoder, a method comprising:

receiving encoded data in a bitstream, the encoded data including a first flag that indicates whether intra block copy (IBC) prediction mode is enabled or disabled, wherein the first flag is part of a sequence parameter set; and decoding a current picture using at least part of the encoded data, the current picture including multiple blocks, wherein the decoding the current picture includes:

determining a second flag that applies for a current block among the multiple blocks, the second flag indicating that a prediction mode for the current block is the IBC prediction mode;

determining a vector for the current block, the vector indicating a displacement within the current picture, including, as part of merge mode processing:

determining a set of merge mode candidates, including, for each of multiple candidates, obtaining the candidate, wherein, if the candidate references the current picture, the candidate is retained in the set of merge mode candidates, but otherwise, the candidate not referencing the current picture, the candidate is excluded from the set of merge mode candidates; and selecting, as the vector for the current block, one of the set of merge mode candidates; and performing IBC prediction for the current block using the vector.

2. The method of claim 1, wherein the determining the vector for the current block further includes decoding a merge mode index, and wherein the selecting the one of the set of merge mode candidates uses the merge mode index.

3. The method of claim 1, wherein the determining the set of merge mode candidates further includes determining that a number of merge mode candidates in the set of merge mode candidates is less than a number of merge mode candidate allowed, and adding one or more candidates to the set of merge mode candidates, up to the number of merge mode candidate allowed.

4. The method of claim 3, wherein a syntax element in the encoded data indicates the number of merge mode candidate allowed.

5. The method of claim 1, wherein the current block is a 4×4 block.

6. The method of claim 1, wherein the determining the second flag includes inferring the second flag.

7. The method of claim 1, wherein the determining the second flag includes decoding the second flag, the encoded data in the bitstream including the second flag.

8. The method of claim 1, wherein the bitstream is constrained to include no syntax elements that lead to referencing of a non-reconstructed part of the current picture during the decoding the current picture.

9. The method of claim 1, wherein the current block is part of a current slice, and wherein the second flag is determined for a coding unit associated with the current block.

10. A computer system comprising a processor and memory, wherein the computer system implements a video encoder configured to perform operations comprising:

determining whether to enable or disable intra block copy (IBC) prediction mode;

setting a first flag to indicate whether the IBC prediction mode is enabled or disabled;

encoding a current picture that includes multiple blocks, wherein the encoding the current picture includes:

determining that a prediction mode for a current block among the multiple blocks is the IBC prediction mode, wherein a second flag, which applies for the current block, indicates that the prediction mode for the current block is the IBC prediction mode;

determining a vector for the current block, the vector indicating a displacement within the current picture, including, as part of merge mode processing:

determining a set of merge mode candidates, including, for each of multiple candidates, obtaining the candidate, wherein, if the candidate references the current picture, the candidate is retained in the set of merge mode candidates, but otherwise, the candidate not referencing the current picture, the candidate is excluded from the set of merge mode candidates; and selecting, as the vector for the current block, one of the set of merge mode candidates; and performing IBC prediction for the current block using the vector; and outputting encoded data as part of a bitstream, the encoded data including the first flag as part of a sequence parameter set.

11. The computer system of claim 10, wherein the encoded data further includes a merge mode index that indicates the selected one of the set of merge mode candidates.

12. The computer system of claim 10, wherein the determining the set of merge mode candidates further includes determining that a number of merge mode candidates in the set of merge mode candidates is less than a number of merge mode candidate allowed, and adding one or more candidates to the set of merge mode candidates, up to the number of merge mode candidate allowed.

13. The computer system of claim 12, wherein a syntax element in the encoded data indicates the number of merge mode candidate allowed.

14. The computer system of claim 10, wherein the current block is a 4×4 block.

15. The computer system of claim 10, wherein the encoded data lacks the second flag.

16. The computer system of claim 10, wherein the encoded data includes the second flag.

17. The computer system of claim 10, wherein the encoding the current picture includes setting values of syntax elements of the bitstream such that none of the syntax elements leads to referencing of a non-reconstructed part of the current picture during decoding the current picture.

18. The computer system of claim 10, wherein the current block is part of a current slice, and wherein the second flag is signaled for a coding unit associated with the current block.

19. One or more computer-readable media having stored thereon encoded data in a bitstream, the encoded data including a first flag that indicates whether intra block copy (IBC) prediction mode is enabled or disabled, wherein the first flag is part of a sequence parameter set for a video sequence, the video sequence including a current picture that includes multiple blocks, the encoded data being organized to facilitate decoding the current picture with a video decoder by operations comprising:

determining a second flag that applies for a current block among the multiple blocks, the second flag indicating that a prediction mode for the current block is the IBC prediction mode;

determining a vector for the current block, the vector indicating a displacement within the current picture, including, as part of merge mode processing:

determining a set of merge mode candidates, including, for each of multiple candidates, obtaining the candidate, wherein, if the candidate references the current picture, the candidate is retained in the set of merge mode candidates, but otherwise, the candidate not referencing the current picture, the candidate is excluded from the set of merge mode candidates; and selecting, as the vector for the current block, one of the set of merge mode candidates; and performing IBC prediction for the current block using the vector.

20. The one or more computer-readable media of claim 19, wherein the determining the second flag includes decoding the second flag, the encoded data in the bitstream including the second flag.

* * * * *